United States Patent [19]

Hayashida et al.

[11] Patent Number: 6,005,034
[45] Date of Patent: *Dec. 21, 1999

[54] PROPYLENE-ETHYLENE COPOLYMER COMPOSITION AND PROCESS FOR PRODUCING THE SAME

[75] Inventors: Teruaki Hayashida; Shinei Gima; Kouichi Hatada; Osamu Kojima; Ken Shimizu; Hirokazu Nakajima, all of Chiba; Takao Nomura, Aichi; Yoshihiro Kanome, Aichi; Takeyoshi Nishio, Aichi, all of Japan

[73] Assignees: Chisso Corpoation, Osaka; Toyota Jidosha Kabushiki Kaisha, Aichi, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,850

[22] PCT Filed: Aug. 30, 1996

[86] PCT No.: PCT/JP96/02449

§ 371 Date: Apr. 30, 1997

§ 102(e) Date: Apr. 30, 1997

[87] PCT Pub. No.: WO97/08218

PCT Pub. Date: Mar. 6, 1997

[30] Foreign Application Priority Data

| Aug. 31, 1995 | [JP] | Japan | 7-248775 |
| May 14, 1996 | [JP] | Japan | 8-119298 |
| May 15, 1996 | [JP] | Japan | 8-120011 |
| May 15, 1996 | [JP] | Japan | 8-120012 |

[51] Int. Cl.$^6$ ............. C08L 23/12; C08F 10/06; C08F 210/06
[52] U.S. Cl. ............. 524/117; 524/90; 524/141; 524/229; 524/372; 524/396; 524/451; 525/106; 525/216; 525/240; 525/247; 525/270; 525/322; 525/323
[58] Field of Search ............. 524/139, 148, 524/378, 394, 417, 451, 117, 90, 141, 229, 372, 396; 525/240, 247, 270, 322, 106, 216, 323

[56] References Cited

U.S. PATENT DOCUMENTS

| 3,960,987 | 6/1976 | Kelley et al. | 260/878 B |
| 4,547,552 | 10/1985 | Toyota et al. | 525/247 |
| 4,946,898 | 8/1990 | Kasahara et al. | 525/240 |
| 5,280,074 | 1/1994 | Schreck et al. | 525/240 |
| 5,362,782 | 11/1994 | McCullough, Jr. et al. | 534/108 |
| 5,461,115 | 10/1995 | Oka | 525/247 |
| 5,548,008 | 8/1996 | Asanuma et al. | 524/99 |
| 5,672,658 | 9/1997 | Oka et al. | 525/53 |

FOREIGN PATENT DOCUMENTS

| 0515855 | 12/1992 | European Pat. Off. . |
| 0700943 | 3/1996 | European Pat. Off. . |
| 0704462 | 4/1996 | European Pat. Off. . |

*Primary Examiner*—David Buttner
*Attorney, Agent, or Firm*—Wenderoth, Lind & Ponack L.L.P.

[57] ABSTRACT

A propylene-ethylene copolymer composition is obtained which has good moldability and an excellent balance of rigidity, toughness, and impact-strength. The composition has a melt flow rate of 10 to 300 g/10 minutes and is obtained by producing 60 to 95% by weight, based on the weight of whole polymer, of a propylene polymer having a melt flow rate (ASTM D1238) in the range of 100 to 1,000 g/10 minutes and having a ratio (Cf) of integrated values of the propylene polymer dissolved in o-dichlorobenzene at a temperature of lower than 112° C., and a temperature of 112° C. or higher, respectively, of 0.5 or less, by carrying out polymerization of propylene in the presence of a highly stereoregular catalyst and hydrogen in a polymerization step (I), and then producing 5 to 40% by weight, based on the weight of whole polymer, of an ethylene-propylene copolymer by feeding ethylene and propylene to the propylene polymer to react so that the content of ethylene becomes 30 to 80% by weight. Also provided is a propylene-ethylene copolymer composition comprising the composition mentioned above and a α-crystal and/or β-crystal nucleator added therewith.

8 Claims, No Drawings

PROPYLENE-ETHYLENE COPOLYMER COMPOSITION AND PROCESS FOR PRODUCING THE SAME

TECHNICAL FIELD

The present invention relates to a propylene-ethylene copolymer composition and a process for producing the composition. More specifically, the present invention relates to a propylene-ethylene copolymer composition having a good moldability and a superior balance of rigidity, toughness, and impact-strength, and relates to a process for producing the composition.

BACKGROUND ART

Since polypropylene resins are comparatively cheap and have various superior characteristics, they have been used in diversified fields. However, improvement in the impact-strength, particularly impact-strength at low temperatures has been required of the resins. Many processes for solving the above problem have been proposed so far. In general, a process for producing a propylene block copolymer wherein a propylene homopolymer component is first formed and then a component of an ethylene-propylene random copolymer is introduced thereto has been used. Whereas the propylene block copolymer has an improved impact-strength as compared with propylene homopolymers, it has a lowered rigidity, hardness and heat-resistance. As the mean for improving the demerits, a method has been proposed in Laid-open Japanese Patent Publication No. Hei 5-117342 wherein the ratio of the melt flow rate of the polymer obtained in the first stage to that obtained in the second stage are specified, and they have been broadly employed in various industrial fields such as automobiles and household appliances.

In recent years, thinning and lightening of injection-molded products or extrusion-molded products have been required from the viewpoints of saving resources and energy. However, polymers having a superior moldability while satisfying characteristics such as rigidity, hardness, heat-resistance, and impact-strength have not yet been provided. In order to obtain thinned and lightened injection-molded products or extrusion-molded products, it is necessary to increase the melt-flow rate of propylene block copolymers. However, when the melt-flow rate was increased, such a problem was raised that the rigidity, toughness and impact-strength were reduced, while the moldability was improved. Even in the case of the Laid-open Japanese Patent Publication No. Hei 5-117342 mentioned above, improvement in this respect is insufficient. For instance, when MFR (i) exceeded 50 g/10 minutes, Izod impact strength was extremely lowered. It is evident that in order to increase the melt flow rate of propylene block copolymers, it is sufficient to use propylene polymers having a low molecular weight. However, the subject of keeping the copolymers, at the same time, from causing the decrease in rigidity, toughness, and impact-strength has not yet been solved.

On the other hand, a polypropylene resin containing a propylene polymer having a position of main dissolution peak (T max) according to a temperature-rise fractionation method of 117° C. or 118° C. or higher, and a half-value width (σ) of the peak of 3.4 degree or 4.0 degree or lower has been proposed in Laid-open Japanese Patent Publication Nos. Hei 5-5010, Hei 5-9218, Hei 5-9219, and Hei 5-32723 with a purpose of improving the rigidity and heat resistance of polypropylene, and also it has been described therein that a nucleator (nucleating agent) may be blended in the resin, if necessary. However, it was unable to regard the impact-strength, toughness, and rigidity of the resulting polypropylene resin as sufficient.

The subject of the present invention is to provide propylene-ethylene copolymer compositions which have a high rigidity, a high toughness, and a high impact strength, and are superior in moldability, and to provide a process for producing such compositions.

DISCLOSURE OF THE INVENTION

In view of the problems described above, an extensive research was conducted by the present inventors to improve the balance of the rigidity, toughness, impact-strength, and moldability of propylene-ethylene copolymers. As a result, it has been found that propylene-ethylene copolymer compositions having a high rigidity, high toughness, high impact-strength, and superior moldability can be obtained by producing the propylene-ethylene copolymer compositions through two stage polymerizations wherein a polypropylene having a high melt-flow rate and excellent performances is produced in a first stage of polymerization, and then an ethylene-propylene copolymer is produced, in a second stage, around the polypropylene produced in the first stage; and further it has been found that more superior polymer compositions can be obtained by adding a specific nucleator to the compositions, to achieve the present invention.

The aspects of the invention claimed by the present application are as follows:

(1) A propylene-ethylene copolymer composition having a melt flow rate of 10 to 300 g/10 minutes and obtained by producing 60 to 95% by weight, based on the weight of whole polymer, of a propylene polymer having a melt flow rate (ASTM D-1238, hereinafter refer to the same meaning) in the range of 100 to 1,000 g/10 minutes and having a ratio (Cf) of integrated values of the propylene polymer dissolved in o-dichlorobenzene at a temperature of lower than 112° C., and a temperature of 112° C. or higher, respectively, which is an index of the stereoregularity in molecules and molecular weight distribution, when the amounts of the propylene polymer dissolved therein at each of the temperatures were determined by raising the temperature of the o-dichlorobenzene continuously or stepwise, of 0.5 or less, by conducting polymerization of propylene in the presence of a highly stereoregular catalyst and hydrogen in a first stage (polymerization step (I)), and then producing 5 to 40% by weight, based on the weight of whole polymer, of an ethylene-propylene copolymer by feeding ethylene and propylene to the product produced in the first stage so that the content of ethylene becomes 30 to 80% by weight, in a second stage (polymerization step (II)).

(2) The propylene-ethylene copolymer composition recited in (1) above wherein a value of common logarithm of the ratio of the melt flow rate of the propylene polymer obtained in the polymerization step (I) (MFR (i)) to the melt flow rate of the ethylene-propylene copolymer obtained in the polymerization step (II) (MFR (ii)), (MFR (i)/MFR (ii)), is 4 to 9.

(3) The propylene-ethylene copolymer composition recited in (1) above wherein a value of common logarithm of the ratio of the melt flow rate of the propylene polymer obtained in the polymerization step (I) (MFR (i)) to the melt flow rate of the ethylene-propylene copolymer obtained in the polymerization step (II) (MFR (ii)), (MFR (i)/MFR (ii)), is 5.05 to 9.
(4) The propylene-ethylene copolymer composition recited in (1) above wherein the melt flow rate is 55 to 110 g/10 minutes.
(5) The propylene-ethylene copolymer composition recited in (1) above wherein the melt flow rate is 210 to 300 g/10 minutes.
(6) A propylene-ethylene copolymer composition comprising 100 parts by weight of the propylene-ethylene copolymer composition recited in (1) above and 0.0001 to 1 part by weight of an α-crystal nucleator blended therewith.
(7) The propylene-ethylene copolymer composition recited in (6) above wherein the α-crystal nucleator is at least one compound selected from the group consisting of talc, metal salts of aromatic carboxylic acids, dibenzylidene sorbitol compounds, metal salts of aromatic phosphoric acids, poly-3-methyl-1-butene, polyvinyl cyclohexanes, and polyallyltrimethylsilanes:
(8) A propylene-ethylene copolymer composition comprising 100 parts by weight of the propylene-ethylene copolymer composition recited in (1) above and 0.0001 to 1 part by weight of a β-crystal nucleator blended therewith.
(9) The propylene-ethylene copolymer composition recited in (8) above wherein the β-crystal nucleator is γ-quinacridone; an amide compound expressed by any one of the following (1) to (3); a mixture of a cyclic phosphorus compound expressed by the following general formula (1) with at least one magnesium compound selected from the group consisting of the following (4) to (8); a mixture of a cyclic phosphorus compound expressed by the following general formula (4) with at least one magnesium compound selected from the group consisting of the following (8) and (9); or a mixture of the foregoing:

(1) $R_3—(R_2)NCO—R_1—CON(R_4)—R_5$
(2) $R_7—CONH—R_6—CONH—R_8$
(3) $R_{10}—CONH—R_9—NHCO—R_{11}$
(4) Magnesium salt of aliphatic acids
(5) Magnesium salt of aliphatic phosphoric acids
(6) Magnesium oxide, magnesium hydroxide, or magnesium carbonate
(7) Magnesium salt of cyclic phosphorus compounds expressed by the following general formula (2)
(8) Magnesium phosphinate compounds expressed by the following general formula (3)
(9) Magnesium sulfate or talc

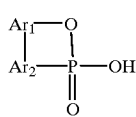

General formula (1)

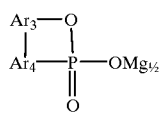

General formula (2)

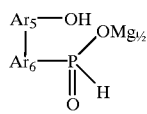

General formula (3)

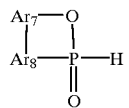

General formula (4)

wherein the above formulas, when $R_1$ represents a residual group of aromatic dicarboxylic acids except for saturated or unsaturated aliphatic groups or alicyclic groups of 1 to 28 carbon atoms, or 3,9-bis(phenyl-4-yl)-2,4,8,10-tetraoxaspiro[5.5]undecane, then $R_2$ and $R_4$ represent hydrogen, and each of $R_3$ and $R_5$ represents the same or different cycloalkyl group or cycloalkenyl group of 3 to 18 carbon atoms, phenyl group, alkylphenyl group, alkenylphenyl group, cycloalkylphenyl group, biphenyl group, alkylcyclohexyl group, alkenylcyclohexyl group, cycloalkylcyclohexyl group, or phenylcyclohexyl group of 7 to 18 carbon atoms, or phenylalkyl group or cyclohexylalkyl group of 7 to 10 carbon atoms, and when $R_1$ represents 3,9-bis(phenyl-4-yl)-2,4,8,10-tetraoxaspiro[5.5]undecane, then $R_2$ to $R_5$ represent the same or different hydrogen, alkyl group, cycloalkyl group, or aryl group; or each of $R_2$ and $R_3$, and $R_4$ and $R_5$ jointly form an alkylene group by bonding to each other at the respective ω-ends, $R_6$ represents a residual group of saturated or unsaturated aliphatic, alicyclic, or aromatic amino acids of 1 to 28 carbon atoms, $R_7$ and $R_8$ represent the same or different cycloalkyl group or cycloalkenyl group of 3 to 18 carbon atoms, phenyl group, alkylphenyl group, alkenylphenyl group, cycloalkylphenyl group, biphenyl group, alkylcyclohexyl group, alkenylcyclohexyl group, cycloalkylcyclohexyl group, or phenylcyclohexyl group of 7 to 18 carbon atoms, or phenylalkyl group or cyclohexylalkyl group of 7 to 10 carbon atoms, $R_9$ represents a residual group of aliphatic diamines, a residual group of alicyclic diamines, or a residual group of aromatic diamines of 1 to 24 carbon atoms (except for xylylenediamine residual group), $R_{10}$ and $R_{11}$ represent the same or different cycloalkyl group or cycloalkenyl group of 3 to 14 carbon atoms, phenyl group, alkylphenyl group or alkenylphenyl group of 7 to 10 carbon atoms, or phenylalkyl group or cyclohexylalkyl group of 7 to 9 carbon atoms, and $Ar_1$ to $Ar_8$ represent arylene group, alkylarylene group, cycloalkylarylene group, arylarylene group, or aralarylene group, respectively.

(10) A process for producing a propylene-ethylene copolymer composition having a melt flow rate of 10 to 300 g/10 minutes, which comprises carrying out the polymerization of propylene by using a highly stereoregular catalyst in the presence of hydrogen in a first stage (polymerization step (I)) to produce 60 to 95% by weight, based on the weight of whole polymer, of a propylene polymer having a melt flow rate in the range of 100 to 1,000 g/10 minutes and having a ratio (Cf) of integrated values of the propylene polymer dissolved in o-dichlorobenzene at a temperature of lower than 112° C., and a temperature of 112° C. or higher, respectively, which is an index of the stereoregularity in molecules and molecular weight distribution, when the amounts of the propylene polymer dissolved therein at each of the temperatures were determined by raising the temperature of the o-dichlorobenzene continuously or stepwise, of 0.5 or less, and then producing 5 to 40% by weight, based on the weight of the whole polymer, of an ethylene-propylene copolymer by feeding ethylene and propylene to the product obtained in the first stage so that the content of ethylene becomes 30 to 80% by weight, in a second stage (polymerization step (II)).

(11) A propylene polymer composed of repetition units expressed by the following general formula (5)

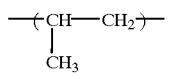

and having a number-average molecular weight of 10,000 to 60,000, a density of 0.90 to 0.92 g/cm³, and a ratio (Cf) of integrated values of the propylene polymer dissolved in o-dichlorobenzene at a temperature of lower than 112° C., and a temperature of 112° C. or higher, respectively, which is an index of the stereoregularity in molecules and molecular weight distribution, when the amounts of the propylene polymer dissolved therein at each of the temperatures were determined by raising the temperature of the o-dichlorobenzene continuously or stepwise, of 0.5 or less.

The range of melt flow rate of the propylene polymer of the polymerization step (I) is 100 to 1,000 g/10 minutes, preferably 100 to 500 g/10 minutes, and most desirably 150 to 350 g/10 minutes. Polymerization is carried out so as to give a value of the Cf, which is an index of the stereoregularity in molecules and the molecular weight distribution of the propylene polymer, of 0.5 or less, preferably 0.1 to 0.4. The smaller the Cf value, the higher the stereoregularity and the narrower the molecular weight distribution.

When the Cf value of the polymer of the polymerization step (I) exceeds 0.5, toughness of the molded product lowers. Further, when the melt flow rate is less than 100 g/10 minutes, fluidity of the polymer lowers, and when it exceeds 1,000 g/10 minutes, toughness of the polymer notably lowers.

The portion of the ethylene-propylene copolymer of the polymerization step (II) is formed by copolymerization of propylene with ethylene, and the content of ethylene in the copolymer is 30 to 80% by weight and more preferably 35 to 55% by weight. When the copolymer has a content of ethylene outside the range mentioned above, impact-strength unpreferably lowers.

Propylene-ethylene copolymer compositions of the present invention comprise a propylene polymer of the polymerization step (I) and an ethylene-propylene copolymer of the polymerization step (II) mentioned above, and the proportion of the propylene polymer of the polymerization step (I) is 60 to 95% by weight and the proportion of the copolymer of the polymerization step (II) is 5 to 40% by weight. When the proportion of the propylene polymer of the polymerization step (I) is less than 60% by weight, rigidity of the product lowers, and when it exceeds 95% by weight, improvement in impact strength at low temperatures is insufficient.

Melt flow rate (which refers to an amount of a melted resin extruded for 10 minutes at 230° C. when a load of 21.18 N is applied; hereinafter abbreviated as MFR) of the propylene-ethylene copolymer compositions of the present invention is 10 to 300 g/10 minutes and preferably 20 to 150 g/10 minutes. The range wherein the moldability and physical properties are most balanced is 55 to 110 g/10 minutes. However, for the applications wherein the moldability is considered to be important, the range of 210 to 300 g/10 minutes is preferable.

Propylene-ethylene copolymer compositions of the present invention are superior in the balance of mechanical strengths, particularly in the balance between rigidity and toughness, and impact-resistance, and at the same time, are superior in the moldability. Thus, the compositions are suitable as resins for thinned or lightened injection molded or extrusion molded articles, and are useful as resources or energy-saving materials.

As examples of the catalyst used in the polymerization steps (I) and (II) for producing the propylene-ethylene copolymer compositions of the present invention, highly stereoregular catalysts comprising a solid catalyst component containing magnesium, titanium, halogen, and a polycarboxylic acid ester, an organoaluminum compound, and an electron donor (Laid-open Japanese Patent Publication Nos. Hei 3-220207, Hei 4-103604, and others), and highly stereoregular catalysts such as the metallocene compounds mentioned below (Laid-open Japanese Patent Publication No. Hei 3-12406, Japanese Patent Application No. Hei 7-136425, and others) can be used, but the catalysts are not limited to these ones.

As the metallocene compounds, for example, compounds consisting of chiral, transition metal compounds represented by the following general formula:

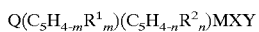

wherein $(C_5H_{4-m}R^1_m)$ and $(C_5H_{4-n}R^2_n)$ represent a substituted cyclopentadienyl group; m and n are an integer of 1 to 3; $R^1$ and $R^2$ may be the same or different, and each of them represents a hydrocarbon group, a silicon-containing hydrocarbon group, or a hydrocarbon group forming one or more hydrocarbon rings which may be bonded to two carbon atoms on the cyclopentadienyl ring and substituted by a hydrocarbon, of 1 to 20 carbon atoms; Q represents a divalent hydrocarbon group, un-substituted silylene group, or a hydrocarbon-substituted silylene group all of which may cross-link $(C_5H_{4-m}R^1_m)$ and $(C_5H_{4-n}R^2_n)$; M represents a transition metal selected from the group consisting of titanium, zirconium, and hafnium; and X and Y may be the same or different, and each of which represents hydrogen, halogen, or hydrocarbon; and aluminoxane compounds can be mentioned.

Metallocene compounds expressed by such a general formula specifically include rac-dimethylsilylene-bis(2-methyl-4,5,6,7-tetrahydroindenyl)zirconium dichloride, rac-dimethylsilylene-bis(2-methyl-4,5,6,7-tetrahydroindenyl) zirconium dimethyl, rac-ethylene-bis(2-methyl-4,5,6,7-tetrahydroindenyl)hafnium dichloride, rac-dimethylsilylene-bis(2-methyl-4-phenylindenyl)zirconium dichloride, rac-dimethylsilylene-bis(2-methyl-4-phenylindenyl)zirconium dimethyl, rac-dimethylsilylene-bis(2-methyl-4 -phenylindenyl)hafnium dichloride, dimethylsilylene(2,4-dimethylcyclopentadienyl)(3',5'-dimethylcyclopentadienyl)titanium dichloride, dimethylsilylene(2,4-dimethylcyclopentadienyl)(3',5'-dimethylcyclopentadienyl)zirconium chloride, dimethylsilylene(2,4-dimethylcyclopentadienyl)(3',5'-dimethylcyclopentadienyl)zirconium dimethyl, dimethylsilylene(2,4-dimethylcyclopentadienyl)(3',5'-dimethylcyclopentadienyl)hafnium chloride, dimethylsilylene(2,4-dimethylcyclopentadienyl)(3',5'-dimethylcyclopentadienyl)hafnium dimethyl, dimethylsilylene(2,3,5-trimethylcyclopentadienyl)(2',4',5'-trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, and dimethylsilylene(2,3,5-trimethylcyclopentadienyl)-(2',4',5'-trimethylcyclopentadienyl)hafnium dimethyl.

Particularly preferable compounds among those are halogenated hafnium compounds and halogenated zirconium compounds, and most preferable ones are halogenated hafnium compounds.

A representative method for synthesizing such metallocene compounds is described, taking dimethylsilylene(2,4-dimethylcyclopentadienyl)(3',5'-dimethylcyclopentadienyl)hafnium dichloride as example, as follows:

Dichlorodimethylsilane is reacted with (2,4-dimethylcyclopentadienyl) (3',5'-dimethylcyclopentadienyl) sodium to obtain dimethyl(2,4-dimethylcyclopentadienyl)(3',5'-dimethylcyclopentadienyl)silane, which is reacted with butyllithium to obtain lithium dimethylsilylene(2,4-dimethylcyclopentadienyl)(3',5'-dimethylcyclopentadienyl), which is reacted in turn with hafnium tetrachloride to obtain dimethylsilylene(2,4-dimethylcyclopentadienyl)(3',5'-dimethylcyclopentadienyl)hafnium dichloride.

Starting materials used for producing the propylene-ethylene copolymer compositions of the present invention are propylene and ethylene, but it is also possible to use other α-olefins, non-conjugated dienes, and others, if necessary, in an extent in which achievement of the objects of the present invention is not disturbed.

The polymerization step (I) is one to produce a highly crystalline propylene homopolymer having a high melt flow rate, and the polymerization step (II) is one to produce a propylene-ethylene copolymer having a low melt flow rate. The polymerizations may be either continuous or batchwise. That is, the polymerization steps (I) and (II) may be carried out successively in the same system, or after a polypropylene produced in the polymerization step (I) was separated, polymerization step (II) may be carried out by feeding ethylene and propylene to the polypropylene, with or without adding the catalyst again, to react with the polypropylene mentioned above. In the polymerization step (I), a slurry polymerization wherein polymerization of propylene is carried out in a hydrocarbon solvent such as n-hexane, n-heptane, n-octane, benzene, and toluene, a bulk polymerization which is carried out in liquefied propylene, or a gas phase polymerization can be adopted. In the case of the slurry polymerization in the polymerization step (I), polymerization temperature is 20 to 90° C., preferably 50 to 80° C., and polymerization pressure is 0 to 5 MPa. In the case of the gas phase polymerization, the polymerization temperature is 20 to 150° C., and the polymerization pressure is 0.2 to 5 MPa. Polymerization step (II) is carried out at a polymerization temperature of 20 to 80° C., preferably 40 to 70° C. and under a polymerization pressure of 0 to 5 MPa in the case of either the slurry polymerization or the gas phase polymerization. For controlling molecular weight, hydrogen gas is used. In the polymerization step (I), it is preferable for obtaining a polymer having a high melt flow rate to increase the concentration of hydrogen, for example, up to 0.15 or more of the ratio of hydrogen concentration/propylene concentration (molar ratio). In the polymerization step (II), it is preferable for obtaining a copolymer having a low melt flow rate to suppress the concentration of hydrogen gas down to an extremely low value, for example, lower than 1 mol %, or to bring the concentration of hydrogen gas into zero.

The logarithmic value of the ratio of the melt flow rate of the polymer obtained in the polymerization step (I) (MFR(i)) to the melt flow rate of the polymer obtained in the polymerization step (II) (MFR(ii)), (MFR(i)/MFR(ii)), is preferably 4 to 9. In order to obtain preferable toughness, flexural modulus, and Izod impact strength, this value is preferably 4 or more, while in order to stably carry out a production of the product, the value is preferably 9 or less. This value is more preferably 5.05 to 9. When the value is 5.05 or more, still more excellent toughness, flexural modulus, and Izod impact strength can be obtained. The value is most preferably 5.05 to 8. When it is 8 or less, further stable production conditions can be obtained.

Further, it is possible to blend the following polymers with the propylene-ethylene copolymer compositions of the present invention within the range where the achievement of effect of the present invention is not disturbed:

conventional crystalline propylene polymers, that is, crystalline propylene homopolymers outside the scope of the present invention, low-crystalline or crystalline random copolymer, or crystalline block copolymer of propylene with one or more α-olefin such as ethylene, butene-1, pentene-1, 4-methyl-pentene-1, hexene-1, and octene-1 containing 70% by weight or more of propylene component, copolymers of propylene with vinyl acetate or acrylic acid ester, or saponified products of the copolymers, copolymers of propylene with an unsaturated silane compound, copolymers of propylene with an unsaturated carboxylic acid or its anhydride, reaction products of the copolymer mentioned just above with a metallic ion compound, modified propylene polymers obtained by modifying crystalline propylene polymers with an unsaturated carboxylic acid or its derivative, and modified propylene polymers modified with an unsaturated silane compound.

It is also possible to blend the following substances:

various kind of elastomers (for example, non-crystalline ethylene-propylene random copolymers, non-crystalline ethylene-propylene-non-conjugated diene terpolymers, low crystalline ethylene-butene-1 random copolymers, low crystalline propylene-butene-1 random copolymers, low crystalline ethylene-hexene-1 random copolymers, low crystalline ethylene-octene-1 random copolymers, polybutadienes, polyisoprenes, polychloroprenes, chlorinated polyethylenes, chlorinated polypropylenes, fluorinated rubbers, styrene-butadiene rubbers, acrylonitrile-butadiene rubbers, styrene-butadiene-styrene block copolymers, styrene-isoprene-styrene block copolymers, styrene-ethylene-butylene-styrene block copolymers, styrene-propylene-butylene-styrene block copolymers, ethylene-ethylene-butylene-ethylene block copolymers, and ethylene-propylene-butylene-ethylene block copolymers), and thermoplastic synthetic resins (for example, ultra-low density polyethylenes, low density polyethylenes, linear low density polyethylenes, medium density polyethylenes, high density polyethylenes, ultra-high molecular weight polyethylenes, non-crystalline ethylene-cyclic alkene copolymers (such as non-crystalline ethylene-tetracyclododecene copolymers), polyolefins excluding crystalline propylene polymers such as polybutenes and poly-4-methylpentenes, atactic polystyrenes, syndiotactic polystyrenes, styrene-acrylonitrile copolymers, acrylonitrile-butadiene-styrene copolymers, methacryl-butadiene-styrene copolymers, polyamides, polyethylene terephthalates, polybutylene terephthalates, polyethylene naphthalates, polybutylene naphthalates, polycarbonates, polyvinyl chlorides, fluorine resins, petroleum resins (such as $C_5$ petroleum resins, hydrogenated $C_5$ petroleum resins, $C_9$ petroleum resins, hydrogenated $C_9$ petroleum resins, $C_5$–$C_9$ copolymerized petroleum resins, hydrogenated $C_5$–$C_9$ copolymerized petroleum resins, and acid-modified $C_9$ petroleum resins each having a softening point of 80 to 200° C.), and DCPD resins (such as cyclopentadiene petroleum resins, hydrogenated cyclopentadiene petroleum resins, cyclopentadiene-$C_5$ copolymerized petroleum resins, hydrogenated cyclopentadiene-$C_5$ copolymerized petroleum resins, cyclopentadiene-$C_9$ copolymerized petroleum resins, hydrogenated cyclopentadiene-$C_9$ copolymerized petroleum resins, cyclopentadiene-$C_5$–$C_9$ copolymerized petroleum resins, and hydrogenated cyclopentadiene-$C_5$–$C_9$ copolymerized petroleum resins each having a softening point of 80 to 200° C.).

When the following α-crystal nucleator and/or β-crystal nucleator is added to the propylene-ethylene copolymer compositions of the present invention, toughness, rigidity, and impact strength of the compositions as formed into molded articles can further be improved.

In the present specification, α-crystal nucleator or β-crystal nucleator means an agent which makes it possible to obtain a crystal of polypropylene in α-form or β-form when a melt-crystallization of the polypropylene is conducted in the presence of the crystal nucleator (Polymer, pp 3443–3448, Vol. 35, No. 16, 1994).

As the α-crystal nucleator used in the present invention, the followings can be mentioned as example:

inorganic compounds such as talc, alum, silica, titanium oxide, calcium oxide, magnesium oxide, carbon black, and clay minerals, carboxylic acids excluding aliphatic monocarboxylic acids such as malonic acid, succinic acid, adipic acid, maleic acid, azelaic acid, sebacic acid, dodecanoic diacid, citric acid, butanetricarboxylic acid, butanetetracarboxylic acid, naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexenecarboxylic acid, 4-cyclohexene-1,2-dicarboxylic acid, benzoic acid, toluic acid, xylyl acid, ethyl benzoate, 4-t-butyl benzoate, salicylic acid, phthalic acid, trimellitic acid, and pyromellitic acid, normal salts or basic salts of lithium, sodium, potassium, magnesium, calcium, strontium, barium, zinc, or aluminum of the carboxylic acids mentioned above, dibenzylidene sorbitol compounds such as 1.3,2.4-dibenzylidenesorbitol,
1.3-benzylidene-2.4-p-methylbenzylidenesorbitol,
1.3-benzylidene-2.4-p-ethylbenzylidenesorbitol,
1.3-p-methylbenzylidene-2.4-benzylidenesorbitol,
1.3-p-ethylbenzylidene-2.4-benzylidenesorbitol,
1.3-p-methylbenzylidene-2.4-p-ethylbenzylidenesorbitol,
1.3-p-ethylbenzylidene-2.4-p-methylbenzylidenesorbitol,
1.3,2.4-bis(p-methylbenzylidene)sorbitol,
1.3,2.4-bis(p-ethylbenzylidene)sorbitol,
1.3,2.4-bis(p-n-propylbenzylidene)sorbitol,
1.3,2.4-bis(p-i-propylbenzylidene)sorbitol,
1.3,2.4-bis(p-n-butylbenzylidene)sorbitol,
1.3,2.4-bis(p-s-butylbenzylidene)sorbitol,
1.3,2.4-bis(p-t-butylbenzylidene)sorbitol,
1.3-(2',4'-dimethylbenzylidene)-2.4-benzylidenesorbitol,
1.3-benzylidene-2.4-(2',4'-dimethylbenzylidene)sorbitol,
1.3,2.4-bis(2',4'-dimethylbenzylidene)sorbitol,
1.3,2.4-bis(3',4'-dimethylbenzylidene)sorbitol,
1.3,2.4-bis(p-methoxybenzylidene)sorbitol,
1.3,2.4-bis(p-ethoxybenzylidene)sorbitol,
1.3-benzylidene-2.4-p-chlorobenzylidenesorbitol,
1.3-p-chlorobenzylidene-2.4-benzylidenesorbitol,
1.3-p-chlorobenzylidene-2.4-p-methylbenzylidenesorbitol,
1.3-p-chlorobenzylidene-2.4-p-ethylbenzylidenesorbitol,
1.3-p-methylbenzylidene-2.4-p-chlorobenzylidenesorbitol,
1.3-p-ethylbenzylidene-2.4-p-chlorobenzylidenesorbitol, and
1.3,2.4-bis(p-chlorobenzylidene)sorbitol, arylphosphate compounds such as lithium-bis(4-t-butylphenyl)phosphate,
sodium-bis(4-t-butylphenyl)phosphate,
lithium-bis(4-cumylphenyl)phosphate,
sodium-bis(4-cumylphenyl)phosphate,
potassium-bis(4-t-butylphenyl)phosphate,
calcium-mono(4-t-butylphenyl)phosphate,
calcium-bis(4-t-butylphenyl)phosphate,
magnesium-mono(4-t-butylphenyl)phosphate,
magnesium-bis(4-t-butylphenyl)phosphate,
zinc-mono(4-t-butylphenyl)phosphate,
zinc-bis(4-t-butylphenyl)phosphate,
aluminumdihydroxy-(4-t-butylphenyl)phosphate,
aluminumihydroxy-bi(4-t-butylphenyl)phosphate,
aluminum-tris(4-t-butylphenyl)phosphate,
sodium-2,2'-methylene-bis(4,6-di-t-butylphenyl)phosphate,
sodium-2,2'-ethylidene-bis(4,6-di-t-butylphenyl)phosphate,
sodium-2,2'-methylene-bis(4-cumyl-6-t-butylphenyl) phosphate,
lithium-2,2'-methylene-bis(4,6-di-t-butylphenyl)phosphate,
lithium-2,2'-ethylidene-bis(4,6-di-t-butylphenyl)phosphate,
lithium-2,2'-methylene-bis(4-cumyl-6-t-butylphenyl) phosphate,
sodium-2,2'-ethylidene-bis(4-i-propyl-6-t-butylphenyl) phosphate,
lithium-2,2'-methylene-bis(4-methyl-6-t-butylphenyl) phosphate,
lithium-2,2'-methylene-bis(4-ethyl-6-t-butylphenyl) phosphate,
sodium-2,2'-butylidene-bis(4,6-di-methylphenyl)phosphate,
sodium-2,2'-butylidene-bis(4,6-di-t-butylphenyl)phosphate,
sodium-2,2'-t-octylmethylene-bis(4,6-di-methylphenyl) phosphate,
sodium-2,2'-t-octylmethylene-bis(4,6-di-t-butylphenyl) phosphate,
sodium-2,2'-methylene-bis(4-methyl-6-t-butylphenyl) phosphate,
sodium-2,2'-methylene-bis(4-ethyl-6-t-butylphenyl) phosphate,
sodium-(4,4'-dimethyl-6,6'-di-t-butyl-2,2'-biphenyl) phosphate,
sodium-2,2'-ethylidene-bis(4-s-butyl-6-t-butylphenyl) phosphate,
sodium-2,2'-methylene-bis'(4,6-di-methylphenyl) phosphate,
sodium-2,2'-methylene-bis'(4,6-di-ethylphenyl)phosphate,
potassium-2,2'-ethylidene-bis(4,6-di-t-butylphenyl) phosphate,
calcium-bis[2,2'-methylene-bis(4,6-di-t-butylphenyl) phosphate], magnesium-bis[2,2'-methylene-bis(4,6-di-t-butylphenyl) phosphate],
zinc-bis[2,2'-methylene-bis(4,6-di-t-butylphenyl) phosphate],
aluminum-tris[2,2'-methylene-bis(4,6-di-t-butylphenyl) phosphate],
calcium-bis[2,2'-methylene-bis(4-methyl-6-t-butylphenyl) phosphate],
calcium-bis[2,2'-ethylidene-bis(4,6-di-t-butylphenyl) phosphate],
calcium-bis[2,2'-thiobis(4-methyl-6-t-butylphenyl) phosphate],
calcium-bis[2,2'-thiobis(4-ethyl-6-t-butylphenyl) phosphate],
calcium-bis[2,2'-thiobis(4,6-di-t-butylphenyl) phosphate],
magnesium-bis[2,2'-thiobis(4,6-di-t-butylphenyl) phosphate],
magnesium-bis[2,2'-thiobis(4-t-octylphenyl) phosphate],
barium-bis[2,2'-methylene-bis(4,6-di-t-butylphenyl) phosphate],
calcium-bis[(4,4'-dimethyl-6,6'-di-t-butyl-2,2'-biphenyl) phosphate],
magnesium-bis[2,2'-ethylidene-bis(4,6-di-t-butylphenyl) phosphate],
barium-bis[2,2'-ethylidene-bis(4,6-di-t-butylphenyl) phosphate],
aluminum-tris[2,2'-ethylidene-bis(4,6-di-t-butylphenyl) phosphate],
aluminumdihydorxy-2,2'-methylene-bis(4,6-di-t-butylphenyl) phosphate,
aluminumdihydorxy-2,2'-methylene-bis(4-cumyl-6-t-butylphenyl)phosphate,
aluminumhydorxy-bis[2,2'-methylene-bis(4,6-di-t-butylphenyl)phosphate],
aluminumhydorxy-bis[2,2'-methylene-bis(4-cumyl-6-t-butylphenyl)phosphate],
titaniumdihydorxy-bis[2,2'-methylene-bis(4,6-di-t-butylphenyl)phosphate],
tindihydroxy-bis[2,2'-methylene-bis(4,6-di-t-butylphenyl) phosphate],
zirconiumoxy-bis[2,2'-methylene-bis(4,6-di-t-butylphenyl) phosphate],
aluminumdihydroxy-2,2'-methylene-bis(4-methyl-6-t-butylphenyl)phosphate,
aluminumhydroxy-bis[2,2'-methylene-bis(4-methyl-6-t-butylphenyl)phosphate],
aluminumdihydroxy-2,2'-ethylidene-bis(4,6-di-t-butylphenyl) phosphate, and
aluminumhydroxy-bis[2,2'-ethylidene-bis(4,6-di-t-butylphenyl)phosphate], mixtures of a cyclic, multi-valent metal arylphosphate compound among the aryl phosphate compounds mentioned above with an alkali metal salt of aliphatic monocarboxylic acids (lithium, sodium, or potassium salt of aliphatic monocarboxylic acids such as acetic acid, lactic acid, propionic acid, acrylic acid, octylic acid, isooctylic acid, nonanoic acid, decanoic acid, lauric acid, myristic acid, palmitic acid, stearic acid, oleic acid, linolic acid, linoleic acid, 12-hydroxystearic acid, ricinolic acid, behenic acid, erucic acid, montanic acid, melissic acid, stearoyl lactic acid, β-dodecylmercaptoacetic acid, β-dodecylmercaptopropionic acid, β-N-lauroyl aminopropionic acid, and β-N-methyl-N-lauryl aminopropionic acid) or a mixture with basic aluminum.lithium.hydroxy.carbonate.hydrate, and high molecular weight compounds such as poly 3-methyl-1-butene, poly 3-methyl-1-pentene, poly 3-ethyl-1-pentene, poly 4-methyl-1-pentene, poly 4-methyl-1-hexene, poly 4,4-dimethyl-1-pentene, poly 4,4-dimethyl-1-hexene, poly 4-ethyl-1-hexene, poly 3-ethyl-1-hexene, polyallylnaphthalene, polyallylnorbornane, atactic polystyrene, syndiotactic polystyrene, polydimethylstyrene, polyvinylnaphthalene, polyallylbenzene, polyallyltoluene, polyvinylcyclopentane, polyvinylcyclohexane, polyvinylcycloheptane, polyvinyltrimethylsilane, and polyallyltrimethylsilane.

Among the compounds mentioned above, followings are particularly preferable:

talc, aluminumhydroxy-bis(4-t-butylbenzoate), 1.3,2.4-dibenzylidenesorbitol, 1.3,2.4-bis(p-methylbenzylidene) sorbitol, 1.3,2.4-bis(p-ethylbenzylidene)sorbitol, 1.3,2.4-bis(2',4'-dimethylbenzylidene)sorbitol, 1.3,2.4-bis(3',4'-dimethylbenzylidene)sorbitol, 1.3-p-chlorobenzylidene-, 2.4-p-methylbenzylidenesorbitol, 1.3,2.4-bis(p-chlorobenzylidene)sorbitol, sodium-bis(4-t-butylphenyl) phosphate, sodium-2,2'-methylene-bis(4-di-t-butylphenyl) phosphate, mixtures of a cyclic polyvalent metal arylphosphate such as calcium-2,2'-methylene-bis(4,6-di-t-butylphenyl)phosphate, aluminum-2,2'-methylene-bis(4,6-di-t-butylphenyl)phosphate, aluminumdihydroxy-2,2'-methylene-bis(4,6-di-t-butylphenyl)phosphate, or aluminumhydroxy-bis[2,2'-methylene-bis(4,6-di-t-butylphenyl)phosphate] with an alkali metal salt of aliphatic monocarboxylic acids; poly 3-methyl-1-butene, polyvinylchlcohexane, and polyallyltrimethylsilane.

Amide compounds expressed by the (1) $R_3$—$(R_2)NCO$—$R_1$—$CON(R_4)$—$R_5$ mentioned above and used in the present invention as β-crystal nucleator can readily be prepared by amidating a prescribed aliphatic, alicyclic, or aromatic dicarboxylic acid and prescribed ammonia, or an aliphatic, alicyclic, or aromatic monoamine.

As the aliphatic dicarboxylic acid, malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanoic diacid, 1,14-tetradecanoic diacid, and 1,18-octadecanoic diacid are specifically mentioned as examples.

As the alicyclic dicarboxylic acids, 1,2-cyclohexanedicarboxylic acid, 1,4-cyclohexanedicarboxylic acid, and 1,4-cyclohexanediacetic acid are specifically mentioned as examples.

As the aromatic dicarboxylic acid, p-phenylene diacetic acid, p-phenylene diethanoic acid, phthalic acid, 4-t-butylphthalic acid, isophthalic acid, 5-t-butylisophthalic acid, terephthalic acid, 1,8-naphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl) methane, bis(4-carboxyphenyl)methane, 2,2-bis(3-carboxyphenyl)propane, 2,2-bis(4-carboxyphenyl)propane, 3,3'-sulfonylbenzoic acid, 4,4'-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, dithiosalicylic acid, and 3,9-bis(4-carboxyphenyl)-2,4,8,10-tetraoxaspiro[5,5] undecane are specifically mentioned as examples.

As the aliphatic monoamine, methylamine, ethylamine, propylamine, butylamine, pentylamine, hexylamine, octylamine, dodecylamine, octadecylamine, octacosylamine, N,N-di(dodecyl)amine, and N,N-di(octadecyl)amine can specifically be mentioned as examples.

As the alicyclic monoamine, cyclopropylamine, cyclobutylamine, cyclopentylamine, cyclohexylamine, 2-methylcyclohexylamine, 3-methylcyclohexylamine, 4-methylcyclohexylamine, 2-ethylcyclohexylamine, 4-ethylcyclohexylamine, 2-propylcyclohexylamine, 2-isopropylcyclohexylamine, 4-propylcyclohexylamine, 4-isopropylcyclohexylamine, 2-t-butylcyclohexylamine, 4-n-butylcyclohexylamine, 4-i-butylcylohexylamine, 4-s-butylcyclohexylamine, 4-t-butylcyclohexylamine, 2,4-di-t-butylcyclohexylamine, 4-n-amylcyclohexylamine, 4-i-amylcyclohexylamine, 4-s-amylcyclohexylamine, 4-t-amylcyclohexylamine, 4-hexylcyclohexylamine, 4-octylcyclohexylamine, 4-nonylcyclohexylamine, 4-decylcyclohexylamine, 4-undecylcyclohexylamine, 4-dodecylcyclohexylamine, 4-cyclohexylcyclohexylamine, 4-phenylcyclohexylamine, cycloheptylamine, cyclododecylamine, cyclohexylmethylamine, α-cyclohexylethylamine, β-cyclohexylethylamine, α-cyclohexylpropylamine, β-cyclohexylpropylamine, γ-cyclohexylpropylamine, 1-adamantylamine, pyrrolidine, piperidine, hexamethyleneimine, N-butyl-N-cyclohexylamine, and N,N-di(cyclohexyl)amine are specifically mentioned as examples.

As the aromatic monoamine, aniline, o-toluidine, m-toluidine, p-toluidine, o-ethylaniline, m-ethylaniline, p-ethylaniline, o-propylaniline, m-propylaniline, p-propylaniline, o-cumidine, m-cumidine, p-cumidine, o-t-butylaniline, p-n-butylaniline, p-i-butylaniline, p-s-butylaniline, p-t-butylaniline, 2,4-di-t-butylaniline, p-n-amylaniline, p-i-amylaniline, p-s-amylaniline, p-i-amylaniline, p-hexylaniline, p-heptylaniline, p-octylaniline, p-nonylaniline, p-decylaniline, p-undecylaniline, p-dodecylaniline, p-cyclohexylaniline, o-aminodiphenyl, m-aminodiphenyl, p-aminodiphenyl, p-aminostyrene, benzylamine, α-phenylethylamine, β-phenylethylamine, α-phenylpropylamine, β-phenylpropylamine, γ-phenylpropylamine, α-naphthylamine, N-butyl-aniline, and N,N-diphenylamine are specifically mentioned as examples.

Amide compounds expressed by the (2) $R_7$—CONH—$R_6$—CONH—$R_8$ mentioned above and used in the present invention as β-crystal nucleator can readily be prepared by amidating a prescribed aliphatic, alicyclic, or aromatic amino acid and an alicyclic or aromatic monocarboxylic acid and monoamine.

As the aliphatic aminoacid, aminoacetic acid, α-aminopropionic acid, β-aminopropionic acid, α-aminoacrylic acid, α-aminobutyric acid, β-aminobutyric acid, γ-aminobutyric acid, α-amino-α-methylbutyric acid, γ-amino-α-methylbutyric acid, α-amino-i-butyric acid, β-amino-i-butyric acid, α-amino-n-valeric acid, δ-amino-n-valeric acid, β-aminocrotonic acid, α-amino-β-methylvaleric acid, α-amino-i-valeric acid, 2-amino-4-pentenoic acid, α-amino-n-caproic acid, 6-aminocaproic acid, α-amino-i-caproic acid, 7-aminoheptanoic acid, α-amino-n-caprylic acid, 8-aminocaprylic acid, 9-aminononanoic acid, 11-aminoundecanoic acid, and 12-aminododecanoic acid can specifically be mentioned as examples.

As the alicyclic amino acid, 1-aminocyclohexanecarboxylic acid, 2-aminocyclohexanecarboxylic acid, 3-aminocyclohexanecarboxylic acid, 4-aminocyclohexanecarboxylic acid, p-aminomethylcyclohexanecarboxylic acid, and 2-amino-2-norbornanecarboxylic acid are specifically mentioned as examples.

As the aromatic amino acid, α-aminophenylacetic acid, α-amino-β-phenylpropionic acid, 2-amino-2-phenylpropionic acid, 3-amino-3-phenylpropionic acid, α-aminocinnamic acid, 2-amino-4-phenylbutyric acid, 4-amino-3-phenylbutyric acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-2-methoxybenzoic acid, 4-amino-3-methoxybenzoic acid, 2-amino-4,5-dimethoxybenzoic acid, o-aminophenylacetic acid, m-aminophenylacetic acid, p-aminophenylacetic acid, 4-(4-aminophenyl)butyric acid, 4-aminomethylbenzoic acid, 4-aminomethylphenylacetic acid, o-aminocinnamic acid, m-aminocinnamic acid, p-aminocinnamic acid, p-aminohippric acid, 2-amino-1-naphthoic acid, 3-amino-1-naphthoic acid, 4-amino-1-naphthoic acid, 5-amino-1-naphthoic acid, 6-amino-1-naphthoic acid, 7-amino-1-naphthoic acid, 8-amino-1-naphthoic acid, 1-amino-2-naphthoic acid, 3-amino-2-naphthoic acid, 4-amino-2-naphthoic acid, 5-amino-2-naphthoic acid, 6-amino-2-naphthoic acid, 7-amino-2-naphthoic acid, and 8-amino-2-naphthoic acid are specifically mentioned as examples.

As the alicyclic monocarboxylic acid, cyclopropanecarboxylic acid, cyclobutanecarboxylic acid, cyclopentanecarboxylic acid, 1-methylcyclopentanecarboxylic acid, 2-methylcyclopentanecarboxylic acid, 3-methylcyclopentanecarboxylic acid, 1-phenylcyclopentanecarboxylic acid, cyclopentenecarboxylic acid, cyclohexanecarboxylic acid, 1-methylcyclohexanecarboxylic acid, 2-methylcyclohexanecarboxylic acid, 3-methylcyclohexanecarboxylic acid, 4-methylcyclohexanecarboxylic acid, 4-propylcyclohexanecarboxylic acid, 4-butylcyclohexanecarboxylic acid, 4-pentylcyclohexanecarboxylic acid, 4-hexylcyclohexanecarboxylic acid, 4-phenylcyclohexanecarboxylic acid, 1-phenylcyclohexanecarboxylic acid, cyclohexenecarboxylic acid, 4-butylcyclohexenecarboxylic acid, cycloheptanecarboxylic acid, 1-cycloheptenecarboxylic acid, 1-methylcycloheptanecarboxylic acid, 4-methylcycloheptanecarboxylic acid, and cyclohexylacetic acid are specifically mentioned as examples.

As the aromatic monocarboxylic acid, benzoic acid, o-methylbenzoic acid, m-methylbenzoic acid, p-methylbenzoic acid, p-ethylbenzoic acid, p-propylbenzoic acid, p-n-butylbenzoic acid, p-i-butylbenzoic acid, p-s-butylbenzoic acid, p-t-butylbenzoic acid, p-n-amylbenzoic acid, p-i-amylbenzoic acid, p-s-amylbenzoic acid, p-t-amylbenzoic acid, p-hexylbenzoic acid, o-phenylbenzoic acid, p-phenylbenzoic acid, p-cyclohexylbenzoic acid, phenylacetic acid, phenylpropionic acid, and phenylbutyric acid are specifically mentioned as examples.

Monoamines which are starting materials for the amide compounds expressed by the (2) mentioned above may be the same as the monoamines which are the starting materials for the amide compounds expressed by the (1) mentioned above.

Amide compounds expressed by the (3) $R_{10}$—CONH—$R_9$—NHCO—$R_{11}$ mentioned above and used in the present invention as β-crystal nucleator can readily be prepared by amidating a prescribed aliphatic diamine, alicyclic diamine, or aromatic diamine and a prescribed monocarboxylic acid according to a conventional method.

As the aliphatic diamine, saturated or unsaturated aliphatic diamines of 1 to 24 carbon atoms are mentioned as examples.

Specifically, methylenediamine, ethylenediamine, 1,2-diaminopropane, 1,3-diaminopropane, 1,4-diaminobutane, 1,3-diaminopentane, 1,5-diaminopentane, and 1,6-diamonohexane are mentioned as examples.

As the alicyclic diamine, diaminocyclohexane, bis(aminoalkyl)cyclohexanes of 8 to 12 carbon atoms, diamino-dicyclohexylmethane, and diamino-dialkyldicyclohexylmethane of 15 to 21 carbon atoms such as 1,2-diaminocyclohexane, 1,4-diaminocyclohexane, 4,4'-diaminodicyclohexylmethane, 4,4'-diamino-3,3'-dimethyldicyclohexylmethane, 1,3-bis(aminomethyl)cyclohexane, and 1,4-bis(aminomethyl)cyclohexane, as well as alicyclic diamines such as isophoronediamine and menthendiamine are mentioned as examples.

As the aromatic diamine, phenylenediamine, naphthalenediamine, diaminodiphenylmethane, diaminodiphenyl ether, diaminodipehnylsulfone, diaminodiphenylsulfide, diaminodiphenyl ketone, and 2,2-bis(aminophenyl)propane are mentioned as examples. More specifically, o-phenylenediamine, m-phenylenediamine, p-phenylenediamine, 1,5-diaminonaphthalene, 4.4'-diaminodiphenylmethane, 4,4'-diaminodiphenyl ether, and 4,4'-diaminodiphenylsulfone are mentioned. However, xylylenediamine can not achieve intended effects although it is an aromatic diamine.

As the monocarboxylic acid mentioned above, phenylacetic acid, cyclohexylacetic acid, cyclopropanecarboxylic acid, cyclobutanecarboxylic acid, cyclopentanecarboxylic acid, cyclohexanecarboxylic acid, 2-methylcyclohexanecarboxylic acid, 3-methylcyclohexanecarboxylic acid, 4-methylcyclohexanecarboxylic acid, 4-t-butylcyclohexanecarboxylic acid, benzoic acid, o-methylbenzoic acid, m-methylbenzoic acid, p-methylbenzoic acid, p-ethylbenzoic acid, p-n-butylbenzoic acid, p-i-butylbenzoic acid, p-s-butylbenzoic acid, and p-t-butylbenzoic acid are mentioned as examples.

As the cyclic phosphorous compounds expressed by the general formula (1) mentioned above and used in the present invention as β-crystal nucleator, the followings can be mentioned as examples:

10-hydroxy-9,10-dihydro-9-oxa-10-phosphaphenanthrene-10-oxide,
1-methyl-10-hydroxy-9,10-dihydro-9-oxa-10-phosphaphenanthrene-10-oxide,
2-methyl-10-hydroxy-9,10-dihydro-9-oxa-10-phosphaphenanthrene-10-oxide,
6-methyl-10-hydroxy-9,10-dihydro-9-oxa-10-phosphaphenanthrene-10-oxide,
7-methyl-10-hydroxy-9,10-dihydro-9-oxa-10-phosphaphenanthrene-10-oxide,
8-methyl-10-hydroxy-9,10-dihydro-9-oxa-10-phosphaphenanthrene-10-oxide,
6,8-dimethyl-10-hydroxy-9,10-dihydro-9-oxa-10-phosphaphenanthrene-10-oxide,
2,6,8-trimethyl-10-hydroxy-9,10-dihydro-9-oxa-10-phosphaphenanthrene-10-oxide,
2-ethyl-10-hydroxy-9,10-dihydro-9-oxa-10-phosphaphenanthrene-10-oxide,
6-ethyl-10-hydroxy-9,10-dihydro-9-oxa-10-phosphaphenanthrene-10-oxide,
8-ethyl-10-hydroxy-9,10-dihydro-9-oxa-10-phosphaphenanthrene-10-oxide,
6,8-diethyl-10-hydroxy-9,10-dihydro-9-oxa-10-phosphaphenanthrene-10-oxide,
2,6,8-triethyl-10-hydroxy-9,10-dihydro-9-oxa-10-phosphaphenanthrene-10-oxide,
2-i-propyl-10-hydroxy-9,10-dihydro-9-oxa-10-phosphaphenanthrene-10-oxide,
6-i-propyl-10-hydroxy-9,10-dihydro-9-oxa-10-phosphaphenanthrene-10-oxide,
8-i-propyl-10-hydroxy-9,10-dihydro-9-oxa-10-phosphaphenanthrene-10-oxide,
6,8-di-i-propyl-10-hydroxy-9,10-dihydro-9-oxa-10-phosphaphenanthrene-10-oxide,
2,6,8-tri-i-propyl-10-hydroxy-9,10-dihydro-9-oxa-10-phosphaphenanthrene-10-oxide,
2-s-butyl-10-hydroxy-9,10-dihydro-9-oxa-10-phosphaphenanthrene-10-oxide,
6-s-butyl-10-hydroxy-9,10-dihydro-9-oxa-10-phosphaphenanthrene-10-oxide,
8-s-butyl-10-hydroxy-9,10-dihydro-9-oxa-10-phosphaphenanthrene-10-oxide,
1,8-di-s-butyl-10-hydroxy-9,10-dihydro-9-oxa-10-phosphaphenanthrene-10-oxide,
2,6,8-tri-s-butyl-10-hydroxy-9,10-dihydro-9-oxa-10-phosphaphenanthrene-10-oxide,
2-t-butyl-10-hydroxy-9,10-dihydro-9-oxa-10-phosphaphenanthrene-10-oxide,
6-t-butyl-10-hydroxy-9,10-dihydro-9-oxa-10-phosphaphenanthrene-10-oxide,
8-t-butyl-10-hydroxy-9,10-dihydro-9-oxa-10-phosphaphenanthrene-10-oxide,
1,6-di-t-butyl-10-hydroxy-9,10-dihydro-9-oxa-10-phosphaphenanthrene-10-oxide,
2,6-di-t-butyl-10-hydroxy-9,10-dihydro-9-oxa-10-phosphaphenanthrene-10-oxide,
2,7-di-t-butyl-10-hydroxy-9,10-dihydro-9-oxa-10-phosphaphenanthrene-10-oxide,
2,8-di-t-butyl-10-hydroxy-9,10-dihydro-9-oxa-10-phosphaphenanthrene-10-oxide,
6,8-di-t-butyl-10-hydroxy-9,10-dihydro-9-oxa-10-phosphaphenanthrene-10-oxide,
2,6,8-tri-t-butyl-10-hydroxy-9,10-dihydro-9-oxa-phosphaphenanthrene-10-oxide,
2-t-amyl-10-hydroxy-9,10-dihydro-9-oxa-10-phosphaphenanthrene-10-oxide,
6-t-amyl-10-hydroxy-9,10-dihydro-9-oxa-10-phosphaphenanthrene-10-oxide,
8-t-amyl-10-hydroxy-9,10-dihydro-9-oxa-10-phosphaphenanthrene-10-oxide,
6,8-di-t-amyl-10-hydroxy-9,10-dihydro-9-oxa-10-phosphaphenanthrene-10-oxide,
2,6,8-tri-t-amyl-10-hydroxy-9,10-dihydro-9-oxa-10-phosphaphenanthrene-10-oxide,
2-t-octyl-10-hydroxy-9,10-dihydro-9-oxa-10-phosphaphenanthrene-10-oxide,
6-t-octyl-10-hydroxy-9,10-dihydro-9-oxa-10-phosphaphenanthrene-10-oxide,
8-t-octyl-10-hydroxy-9,10-dihydro-9-oxa-10-phosphaphenanthrene-10-oxide,
6,8-di-t-octyl-10-hydroxy-9,10-dihydro-9-oxa-10-phosphaphenanthrene-10-oxide,
2,6,8-tri-t-octyl-10-hydroxy-9,10-dihydro-9-oxa-10-phosphaphenanthrene-10-oxide,
2-cyclohexyl-10-hydroxy-9,10-dihydro-9-oxa-10-phosphaphenanthrene-10-oxide,
6-cyclohexyl-10-hydroxy-9,10-dihydro-9-oxa-10-phosphaphenanthrene-10-oxide, 8-cyclohexyl-10-hydroxy-9,10-dihydro-9-oxa-10-phosphaphenanthrene-10-oxide,
6,8-di-cyclohexyl-10-hydroxy-9,10-dihydro-9-oxa-10-phosphaphenanthrene-10-oxide,
2,6,8-tri-cyclohexyl-10-hydroxy-9,10-dihydro-9-oxa-10-phosphaphenanthrene-10-oxide,
6-phenyl-10-hydroxy-9,10-dihydro-9-oxa-10-phosphaphenanthrene-10-oxide,
2-benzyl-10-hydroxy-9,10-dihydro-9-oxa-10-phosphaphenanthrene-10-oxide,
6-benzyl-10-hydroxy-9,10-dihydro-9-oxa-10-phosphaphenanthrene-10-oxide,
8-benzyl-10-hydroxy-9,10-dihydro-9-oxa-10-phosphaphenanthrene-10-oxide,
6,8-di-benzyl-10-hydroxy-9,10-dihydro-9-oxa-10-phosphaphenanthrene-10-oxide,
2,6,8-tri-benzyl-10-hydroxy-9,10-dihydro-9-oxa-10-phosphaphenanthrene-10-oxide,
2-(α-methylbenzyl)-10-hydroxy-9,10-dihydro-9-oxa-10-phosphaphenanthrene-10-oxide,
6-(α-methylbenzyl)-10-hydroxy-9,10-dihydro-9-oxa-10-phosphaphenanthrene-10-oxide,
8-(α-methylbenzyl)-10-hydroxy-9,10-dihydro-9-oxa-10-phosphaphenanthrene-10-oxide,
6,8-di(α-methylbenzyl)-10-hydroxy-9,10-dihydro-9-oxa-10-phosphaphenanthrene-10-oxide,
2,6,8-tri(α-methylbenzyl)-10-hydroxy-9,10-dihydro-9-oxa-10 -phosphaphenanthrene-10-oxide,
2,6-di(α,α-dimethylbenzyl)-10-hydroxy-9,10-dihydro-9-oxa-10-phosphaphenanthrene-10-oxide,
6-t-butyl-8-methyl-10-hydroxy-9,10-dihydro-9-oxa-10-phosphaphenanthrene-10-oxide,
6-benzyl-8-methyl-10-hydroxy-9,10-dihydro-9-oxa-10-phosphaphenanthrene-10-oxide,
6-cyclohexyl-8-t-butyl-10-hydroxy-9,10-dihydro-9-oxa-10-phosphaphenanthrene-10-oxide,
6-benzyl-8-t-butyl-10-hydroxy-9,10-dihydro-9-oxa-10-phosphaphenanthrene-10-oxide,
6-(α-methylbenzyl)-8-t-butyl-10-hydroxy-9,10-dihydro-9-oxa-10-phosphaphenanthrene-10-oxide,
6-t-butyl-8-cyclohexyl-10-hydroxy-9,10-dihydro-9-oxa-10-phosphaphenanthrene-10-oxide,
6-benzyl-8-cyclohexyl-10-hydroxy-9,10-dihydro-9-oxa-10-phosphaphenanthrene-10-oxide,
6-t-butyl-8-benzyl-10-hydroxy-9,10-dihydro-9-oxa-10-phosphaphenanthrene-10-oxide,
6-cyclohexyl-8-benzyl-10-hydroxy-9,10-dihydro-9-oxa-10-phosphaphenanthrene-10-oxide,
2,6-di-t-butyl-8-benzyl-10-hydroxy-9,10-dihydro-9-oxa-10-phosphaphenanthrene-10-oxide, and
2,6-dicyclohexyl-8-benzyl-10-hydroxy-9,10-dihydro-9-oxa-10-phosphaphenanthrene-10-oxide.

These cyclic phosphorous compounds can, of course, be used singly, but more than one of them can also be used in combination.

As the magnesium compound expressed by one of the (4) to (8) mentioned above and used in combination with the cyclic phosphorous compounds which are expressed by the general formula (1) mentioned above and used in the present invention as β-crystal nucleator, the followings can be mentioned as examples:

magnesium acetate, magnesium propionate, magnesium n-butyrate, magnesium i-butyrate, magnesium n-valerate, magnesium i-valerate, magnesium n-hexanoate, magnesium n-octanoate, magnesium 2-ethylhexanoate, magnesium decanoate, magnesium laurate, magnesium myristinate, magnesium myristoleate, magnesium palmitate, magnesium palmitoleate, magnesium stearate, magnesium oleate, magnesium linoleate, magnesium linolenate, magnesium arachate, magnesium behenate, magnesium erucate, magnesium lignocerate, magnesium cerotate, magnesium montanate, magnesium melissinate, magnesium 12-hydroxyoctadecanate, magnesium ricinoleate, magnesium cerebronate, magnesium (mono, dimixed) hexylphosphate, magnesium (mono, dimixed) octylphosphate, magnesium (mono, dimixed) 2-ethylhexylphosphate, magnesium (mono, dimixed) decylphosphate, magnesium (mono, dimixed) laurylphosphate, magnesium (mono, dimixed) myristylphosphate, magnesium (mono, dimixed) palmitylphosphate, magnesium (mono, dimixed) stearylphosphate, magnesium (mono, dimixed) oleylphosphate, magnesium (mon, dimixed) linolphosphate, magnesium (mono, dimixed) linolylphosphate, magnesium (mono, dimixed) docosylphosphate, magnesium (mono, dimixed) erucylphosphate, magnesium (mono, dimixed) tetracosylphosphate, magnesium (mono, dimixed) hexacosylphosphate, magnesium (mono, dimixed) octacosylphosphate, magnesium oxide, magnesium hydroxide, magnesium carbonate, magnesium salts of cyclic phosphorous compounds such as 10-hydroxy-9,10-dihydro-9-oxa-10-phosphaphenanthrene-10-oxide,
1-methyl-10-hydroxy-9,10-dihydro-9-oxa-10-phosphaphenanthrene-10-oxide,
2-methyl-10-hydroxy-9,10-dihydro-9-oxa-10-phosphaphenanthrene-10-oxide,
6-methyl-10-hydroxy-9,10-dihydro-9-oxa-10-phosphaphenanthrene-10-oxide,
7-methyl-10-hydroxy-9,10-dihydro-9-oxa-10-phosphaphenanthrene-10-oxide,
8-methyl-10-hydroxy-9,10-dihydro-9-oxa-10-phosphaphenanthrene-10-oxide,
6,8-dimethyl-10-hydroxy-9,10-dihydro-9-oxa-10-phosphaphenanthrene-10-oxide,
2,6,8-trimethyl-10-hydroxy-9,10-dihydro-9-oxa-10-phosphaphenanthrene-10-oxide,
2-ethyl-10-hydroxy-9,10-dihydro-9-oxa-10-phosphaphenanthrene-10-oxide,
6-ethyl-10-hydroxy-9,10-dihydro-9-oxa-10-phosphaphenanthrene-10-oxide,
8-ethyl-10-hydroxy-9,10-dihydro-9-oxa-10-phosphaphenanthrene-10-oxide,
6,8-diethyl-10-hydroxy-9,10-dihydro-9-oxa-10-phosphaphenanthrene-10-oxide,
2,6,8-triethyl-10-hydroxy-9,10-dihydro-9-oxa-10-phosphaphenanthrene-10-oxide,
2-i-propyl-10-hydroxy-9,10-dihydro-9-oxa-10-phosphaphenanthrene-10-oxide,
6-i-propyl-10-hydroxy-9,10-dihydro-9-oxa-10-phosphaphenanthrene-10-oxide,
8-i-propyl-10-hydroxy-9,10-dihydro-9-oxa-10-phosphaphenanthrene-10-oxide,
6,8-di-i-propyl-10-hydroxy-9,10-dihydro-9-oxa-10-phosphaphenanthrene-10-oxide,
2,6,8-tri-i-propyl-10-hydroxy-9,10-dihydro-9-oxa-10-phosphaphenanthrene-10-oxide,
2-s-butyl-10-hydroxy-9,10-dihydro-9-oxa-10-phosphaphenanthrene-10-oxide,
6-s-butyl-10-hydroxy-9,10-dihydro-9-oxa-10-phosphaphenanthrene-10-oxide,
8-s-butyl-10-hydroxy-9,10-dihydro-9-oxa-10-phosphaphenanthrene-10-oxide, 1,8-di-s-butyl-10-hydroxy-9,10-dihydro-9-oxa-10-phosphaphenanthrene-10-oxide,
2,6,8-tri-s-butyl-10-hydroxy-9,10-dihydro-9-oxa-10-phosphaphenanthrene-10-oxide,
2-t-butyl-10-hydroxy-9,10-dihydro-9-oxa-10-phosphaphenanthrene-10-oxide,
6-t-butyl-10-hydroxy-9,10-dihydro-9-oxa-10-phosphaphenanthrene-10-oxide,
8-t-butyl-10-hydroxy-9,10-dihydro-9-oxa-10-phosphaphenanthrene-10-oxide,
1,6-di-t-butyl-10-hydroxy-9,10-dihydro-9-oxa-10-phosphaphenanthrene-10-oxide,
2,6-di-t-butyl-10-hydroxy-9,10-dihydro-9-oxa-10-phosphaphenanthrene-10-oxide,
2,7-di-t-butyl-10-hydroxy-9,10-dihydro-9-oxa-10-phosphaphenanthrene-10-oxide,
2,8-di-t-butyl-10-hydroxy-9,10-dihydro-9-oxa-10-phosphaphenanthrene-10-oxide,
6,8-di-t-butyl-10-hydroxy-9,10-dihydro-9-oxa-10-phosphaphenanthrene-10-oxide,
2,6,8-tri-t-butyl-10-hydroxy-9,10-dihydro-9-oxa-10-phosphaphenanthrene-10-oxide,
2-t-amyl-10-hydroxy-9,10-dihydro-9-oxa-10-phosphaphenanthrene-10-oxide,
6-t-amyl-10-hydroxy-9,10-dihydro-9-oxa-10-phosphaphenanthrene-10-oxide,
8-t-amyl-10-hydroxy-9,10-dihydro-9-oxa-10-phosphaphenanthrene-10-oxide,
6,8-di-t-amyl-10-hydroxy-9,10-dihydro-9-oxa-10-phosphaphenanthrene-10-oxide,
2,6,8-tri-t-amyl-10-hydroxy-9,10-dihydro-9-oxa-10-phosphaphenanthrene-10-oxide,
2-t-octyl-10-hydroxy-9,10-dihydro-9-oxa-10-phosphaphenanthrene-10-oxide,
6-t-octyl-10-hydroxy-9,10-dihydro-9-oxa-10-phosphaphenanthrene-10-oxide,
8-t-octyl-10-hydroxy-9,10-dihydro-9-oxa-10-phosphaphenanthrene-10-oxide,
6,8-di-t-octyl-10-hydroxy-9,10-dihydro-9-oxa-10-phosphaphenanthrene-10-oxide,
2,6,8-tri-t-octyl-10-hydroxy-9,10-dihydro-9-oxa-10-phosphaphenanthrene-10-oxide,
2-cyclohexyl-10-hydroxy-9,10-dihydro-9-oxa-10-phosphaphenanthrene-10-oxide,
6-cyclohexyl-10-hydroxy-9,10-dihydro-9-oxa-10-phosphaphenanthrene-10-oxide,
8-cyclohexyl-10-hydroxy-9,10-dihydro-9-oxa-10-phosphaphenanthrene-10-oxide,
6,8-di-cyclohexyl-10-hydroxy-9,10-dihydro-9-oxa-10-phosphaphenanthrene-10-oxide,
2,6,8-tri-cyclohexyl-10-hydroxy-9,10-dihydro-9-oxa-10-phosphaphenanthrene-10-oxide,
6-phenyl-10-hydroxy-9,10-dihydro-9-oxa-10-phosphaphenanthrene-10-oxide,
2-benzyl-10-hydroxy-9,10-dihydro-9-oxa-10-phosphaphenanthrene-10-oxide,
6-benzyl-10-hydroxy-9,10-dihydro-9-oxa-10-phosphaphenanthrene-10-oxide,
8-benzyl-10-hydroxy-9,10-dihydro-9-oxa-10-phosphaphenanthrene-10-oxide,
6,8-di-benzyl-10-hydroxy-9,10-dihydro-9-oxa-10-phosphaphenanthrene-10-oxide,
2,6,8-tri-benzyl-10-hydroxy-9,10-dihydro-9-oxa-10-phosphaphenanthrene-10-oxide,
2-($\alpha$-methylbenzyl)-10-hydroxy-9,10-dihydro-9-oxa-10-phosphaphenanthrene-10-oxide,
6-($\alpha$-methylbenzyl)-10-hydroxy-9,10-dihydro-9-oxa-10-phosphaphenanthrene-10-oxide,
8-($\alpha$-methylbenzyl)-10-hydroxy-9,10-dihydro-9-oxa-10-phosphaphenanthrene-10-oxide,
6,8-di($\alpha$-methylbenzyl)-10-hydroxy-9,10-dihydro-9-oxa-10-phosphaphenanthrene-10-oxide,
2,6,8-tri($\alpha$-methylbenzyl)-10-hydroxy-9,10-dihydro-9-oxa-10-phosphaphenanthrene-10-oxide,
2,6-di($\alpha$,$\alpha$-dimethylbenzyl)-10-hydroxy-9,10-dihydro-9-oxa-10-phosphaphenanthrene-10-oxide,
6-t-butyl-8-methyl-10-hydroxy-9,10-dihydro-9-oxa-10-phosphaphenanthrene-10-oxide,
6-benzyl-8-methyl-10-hydroxy-9,10-dihydro-9-oxa-10-phosphaphenanthrene-10-oxide,
6-cyclohexyl-8-t-butyl-10-hydroxy-9,10-dihydro-9-oxa-10-phosphaphenanthrene-10-oxide,
6-benzyl-8-t-butyl-10-hydroxy-9,10-dihydro-9-oxa-10-phosphaphenanthrene-10-oxide,
6-($\alpha$-methylbenzyl)-8-t-butyl-10-hydroxy-9,10-dihydro-9-oxa-10-phosphaphenanthrene-10-oxide,
6-t-butyl-8-cyclohexyl-10-hydroxy-9,10-dihydro-9-oxa-10-phosphaphenanthrene-10-oxide,
6-benzyl-8-cyclohexyl-10-hydroxy-9,10-dihydro-9-oxa-10-phosphaphenanthrene-10-oxide,
6-t-butyl-8-benzyl-10-hydroxy-9,10-dihydro-9-oxa-10-phosphaphenanthrene-10-oxide,
6-cyclohexyl-8-benzyl-10-hydroxy-9,10-dihydro-9-oxa-10-phosphaphenanthrene-10-oxide,
2,6-di-t-butyl-8-benzyl-10-hydroxy-9,10-dihydro-9-oxa-10-phosphaphenanthrene-10-oxide, and
2,6-dicyclohexyl-8-benzyl-10-hydroxy-9,10-dihydro-9-oxa-10-phosphaphenanthrene-10-oxide;
magnesium-bis(1'-hydroxy-2,2'-biphenylenephosphinate),
magnesium-bis(5-methyl-1'-hydroxy-2,2'-biphenylenephosphinate),
magnesium-bis(6-methyl-1'-hydroxy-2,2'-biphenylenephosphinate),
magnesium-bis(1'-hydroxy-4'-methyl-2,2'-biphenylenephosphinate),
magnesium-bis(1'-hydroxy-5'-methyl-2,2'-biphenylenephosphinate),
magnesium-bis(1'-hydroxy-6'-methyl-2,2'-biphenylenephosphinate),
magnesium-bis(1'-hydroxy-4',6'-dimethyl-2,2'-biphenylenephosphinate),
magnesium-bis(5,4'6'-trimethyl-1'-hydroxy-2,2'-biphenylenephosphinate),
magnesium-bis(5-ethyl-1'-hydroxy-2,2'-biphenylenephosphinate),
magnesium-bis(1'-hydroxy-4'-ethyl-2,2'-biphenylenephosphinate),
magnesium-bis(1'-hydroxy-6'-ethyl-2,2'-biphenylenephosphinate),
magnesium-bis(1'-hydroxy-4',6'-diethyl-2,2'-biphenylenephosphinate),
magnesium-bis(5,4',6'-triethyl-1'-hydroxy-2,2'-biphenylenephosphinate),
magnesium-bis(5-i-propyl-1'-hydroxy-2,2'-biphenylenephosphinate),
magnesium-bis(1'-hydroxy-4'-i-propyl-2,2'-biphenylenephosphinate),
magnesium-bis(1'-hydroxy-6'-i-propyl-2,2'-biphenylenephosphinate),
magnesium-bis(1-hydroxy-4',6'-di-i-propyl-2,2'-biphenylenephosphinate),
magnesium-bis(5,4',6'-tri-i-propyl-1'-hydroxy-2,2'-biphenylenephosphinate),
magnesium-bis(5-s-butyl-1'-hydroxy-2,2'-biphenylenephosphinate), magnesium-bis(1'-hydroxy-4'-s-butyl-2,2'-biphenylenephosphinate),
magnesium-bis(1'-hydroxy-6'-s-butyl-2,2'-biphenylenephosphinate),
magnesium-bis(6,6'-di-s-butyl-1'-hydroxy-2,2'-biphenylenephosphinate),
magnesium-bis(5,4',6'-tri-s-butyl-1'-hydroxy-2,2'-biphenylenephosphinate),
magnesium-bis(5-t-butyl-1'-hydroxy-2,2'-biphenylenephosphinate),
magnesium-bis(1'-hydroxy-4'-t-butyl-2,2'-biphenylenephosphinate),
magnesium-bis(1'-hydroxy-6'-t-butyl-2,2'-biphenylenephosphinate),
magnesium-bis(5,6'-di-t-butyl-hydroxy-2,2'-biphenylenephosphinate),
magnesium-bis(5,4'-di-t-butyl-1'-hydroxy-2,2'-biphenylenephosphinate),
magnesium-bis(5,5'-di-t-butyl-1-hydroxy-2,2'-biphenylenephosphinate),
magnesium-bis(6,4'-di-t-butyl-1'-hydroxy-2,2'-biphenylenephosphinate),
magnesium-bis(1'-hydroxy-4',6'-di-t-butyl-2,2'-biphenylenephosphinate),
magnesium-bis(5,4',6'-tri-t-butyl-1'-hydroxy-2,2'-biphenylenephosphinate),
magnesium-bis(5-t-amyl-1'-hydroxy-2,2'-biphenylenephosphinate),
magnesium-bis(1'-hydroxy-4'-t-amyl-2,2'-biphenylenephosphinate),
magnesium-bis(1'-hydroxy-6'-t-amyl-2,2'-biphenylenephosphinate),
magnesium-bis(1'-hydroxy-4',6'-di-t-amyl-2,2'-biphenylenephosphinate),
magnesium-bis(5,4',6'-tri-t-amyl-1'-hydroxy-2,2'-biphenylenephosphinate),
magnesium-bis(5-t-octyl-1'-hydroxy-2,2'-biphenylenephosphinate),
magnesium-bis(1'-hydroxy-4'-t-octyl-2,2'-biphenylenephosphinate),
magnesium-bis(1'-hydroxy-6'-t-octyl-2,2'-biphenylenephosphinate),
magnesium-bis(1'-hydroxy-4',6'-di-t-octyl-2,2'-biphenylenephosphinate),
magnesium-bis(5,4',6'-tri-t-octyl-1'-hydroxy-2,2'-biphenylenephosphinate),
magnesium-bis(5-cyclohexyl-1'-hydroxy-2,2'-biphenylenephosphinate),
magnesium-bis(1'-hydroxy-4'-cyclohexyl-2,2'-biphenylenephosphinate),
magnesium-bis(1'-hydroxy-6'-cyclohexyl-2,2'-biphenylenephosphinate),
magnesium-bis(1'-hydroxy-4',6'-di-cyclohexyl-2,2'-biphenylenephosphinate),
magnesium-bis(5,4',6'-tri-cyclohexyl-1'-hydroxy-2,2'-biphenylenephosphinate),
magnesium-bis(1'-hydroxy-4'-phenyl-2,2'-biphenylenephosphinate),
magnesium-bis(5-benzyl-1'-hydroxy-2,2'-biphenylenephosphinate),
magnesium-bis(1'-hydroxy-4'-benzyl-2,2'-biphenylenephosphinate),
magnesium-bis(1'-hydroxy-6'-benzyl-2,2'-biphenylenephosphinate),
magnesium-bis(1'-hydroxy-4',6'-di-benzyl-2,2'-biphenylenephosphinate),
magnesium-bis(5,4',6'-tri-benzyl-1'-hydroxy-2,2'-biphenylenephosphinate),
magnesium-bis[5-($\alpha$-methylbenzyl)-1'-hydroxy-2,2'-biphenylenephosphinate],
magnesium-bis[1'-hydroxy-4'-($\alpha$-methylbenzyl)-2,2'-biphenylenephosphinate],
magnesium-bis[1'-hydroxy-6'-($\alpha$-methylbenzyl)-2,2'-biphenylenephosphinate],
magnesium-bis[1'-hydroxy-4',6'-di($\alpha$-methylbenzyl)-2,2'-biphenylenephosphinate],
magnesium-bis[5,4',6'-tri($\alpha$-methylbenzyl)-1'-hydroxy-2,2'-biphenylenephosphinate],
magnesium-bis[5,4'-di($\alpha$,$\alpha$-dimethylbenzyl)-1'-hydroxy-2,2'-biphenylenephosphinate],
magnesium-bis(1'-hydroxy-4'-t-butyl-6'-methyl-2,2'-biphenylenephosphinate),
magnesium-bis(1'-hydroxy-4'-benzyl-6'-methyl-2,2'-biphenylenephosphinate),
magnesium-bis(1'-hydroxy-4'-cyclohexyl-6'-t-butyl-2,2'-biphenylenephosphinate),
magnesium-bis(1'-hydroxy-4'-benzyl-6'-t-butyl-2,2'-biphenylenephosphinate),
magnesium-bis[1'-hydroxy-4'-($\alpha$-methylbenzyl)-6'-t-butyl-2,2'-biphenylenephosphinate],
magnesium-bis(1'-hydroxy-4'-t-butyl-6'-cyclohexyl-2,2'-biphenylenephosphinate),
magnesium-bis(1'-hydroxy-4'-benzyl-6'-cyclohexyl-2,2'-biphenylenephosphinate),
magnesium-bis(1'-hydroxy-4'-t-butyl-6'-benzyl-2,2'-biphenylenephosphinate),
magnesium-bis(1'-hydroxy-4'-cyclohexyl-6'-benzyl-2,2'-biphenylenephosphinate),
magnesium-bis(5,4'-di-t-butyl-6'-benzyl-1'-hydroxy-2,2'-biphenylenephosphinate), and
magnesium-bis(5,4'-dicyclohexyl-6'-benzyl-1'-hydroxy-2,2'-biphenylenephosphinate).

These magnesium compounds can, of course, be used singly, but more than one of them can also be used in combination.

Weight proportion of the mixture of these cyclic phosphorous compound with these magnesium compounds is not particularly restricted, but it is usually 0.01 to 100 parts by weight, preferably 0.1 to 10 parts by weight of the magnesium compounds per 1 part by weight of the cyclic phosphorous compounds.

As the cyclic phosphorous compounds expressed by the general formula (4) mentioned above and used in the present invention as β-crystal nucleator, the followings can be mentioned as examples:

9,10-dihydro-9-oxa-10-phosphaphenanthrene-10-oxide,
1-methyl-9,10-dihydro-9-oxa-10-phosphaphenanthrene-10-oxide, p 2 -methyl-9,10-dihydro-9-oxa-10-phosphaphenanthrene-10-oxide,
6-methyl-9,10-dihydro-9-oxa-10-phosphaphenanthrene-10-oxide,
7-methyl-9,10-dihydro-9-oxa-10-phosphaphenanthrene-10-oxide,
8-methyl-9,10-dihydro-9-oxa-10-phosphaphenanthrene-10-oxide,
6,8-dimethyl-9,10-dihydro-9-oxa-10-phosphaphenanthrene-10-oxide,
2,6,8-trimethyl-9,10-dihydro-9-oxa-10-phosphaphenanthrene-10-oxide,
2-ethyl-9,10-dihydro-9-oxa-10-phosphaphenanthrene-10-oxide,
6-ethyl-9,10-dihydro-9-oxa-10-phosphaphenanthrene-10-oxide, 8-ethyl-9,10-dihydro-9-oxa-10-phosphaphenanthrene-10-oxide,
6,8-diethyl-9,10-dihydro-9-oxa-10-phosphaphenanthrene-10-oxide,
2,6,8-triethyl-9,10-dihydro-9-oxa-10-phosphaphenanthrene-10-oxide,
2-i-propyl-9,10-dihydro-9-oxa-10-phosphaphenanthrene-10-oxide,
6-i-propyl-9,10-dihydro-9-oxa-10-phosphaphenanthrene-10-oxide,
8-i-propyl-9,10-dihydro-9-oxa-10-phosphaphenanthrene-10-oxide,
6,8-di-i-propyl-9,10-dihydro-9-oxa-10-phosphaphenanthrene-10-oxide,
2,6,8-tri-i-propyl-9,10-dihydro-9-oxa-10-phosphaphenanthrene-10-oxide,
2-s-butyl-9,10-dihydro-9-oxa-10-phosphaphenanthrene-10-oxide,
6-s-butyl-9,10-dihydro-9-oxa-10-phosphaphenanthrene-10-oxide,
8-s-butyl-9,10-dihydro-9-oxa-10-phosphaphenanthrene-10-oxide,
1,8-di-s-butyl-9,10-dihydro-9-oxa-10-phosphaphenanthrene-10-oxide,
2,6,8-tri-s-butyl-9,10-dihydro-9-oxa-10-phosphaphenanthrene-10-oxide,
2-t-butyl-9,10-dihydro-9-oxa-10-phosphaphenanthrene-10-oxide,
6-t-butyl-9,10-dihydro-9-oxa-10-phosphaphenanthrene-10-oxide,
8-t-butyl-9,10-dihydro-9-oxa-10-phosphaphenanthrene-10-oxide,
1,6-di-t-butyl-9,10-dihydro-9-oxa-10-phosphaphenanthrene-10-oxide,
2,6-di-t-butyl-9,10-dihydro-9-oxa-10-phosphaphenanthrene-10-oxide,
2,7-di-t-butyl-9,10-dihydro-9-oxa-10-phosphaphenanthrene-10-oxide,
2,8-di-t-butyl-9,10-dihydro-9-oxa-10-phosphaphenanthrene-10-oxide,
6,8-di-t-butyl-9,10-dihydro-9-oxa-10-phosphaphenanthrene-10-oxide,
2,6,8-tri-t-butyl-9,10-dihydro-9-oxa-10-phosphaphenanthrene-10-oxide,
2-t-amyl-9,10-dihydro-9-oxa-10-phosphaphenanthrene-10-oxide,
6-t-amyl-9,10-dihydro-9-oxa-10-phosphaphenanthrene-10-oxide,
8-t-amyl-9,10-dihydro-9-oxa-10-phosphaphenanthrene-10-oxide,
6,8-di-t-amyl-9,10-dihydro-9-oxa-10-phosphaphenanthrene-10-oxide,
2,6,8-tri-t-amyl-9,10-dihydro-9-oxa-10-phosphaphenanthrene-10-oxide,
2-t-octyl-9,10-dihydro-9-oxa-10-phosphaphenanthrene-10-oxide,
6-t-octyl-9,10-dihydro-9-oxa-10-phosphaphenanthrene-10-oxide,
8-t-octyl-9,10-dihydro-9-oxa-10-phosphaphenanthrene-10-oxide,
6,8-di-t-octyl-9,10-dihydro-9-oxa-10-phosphaphenanthrene-10-oxide,
2,6,8-tri-t-octyl-9,10-dihydro-9-oxa-10-phosphaphenanthrene-10-oxide,
2-cyclohexyl-9,10-dihydro-9-oxa-10-phosphaphenanthrene-10-oxide,
6-cyclohexyl-9,10-dihydro-9-oxa-10-phosphaphenanthrene-10-oxide,
8-cyclohexyl-9,10-dihydro-9-oxa-10-phosphaphenanthrene-10-oxide,
6,8-di-cyclohexyl-9,10-dihydro-9-oxa-10-phosphaphenanthrene-10-oxide,
2,6,8-tri-cyclohexyl-9,10-dihydro-9-oxa-10-phosphaphenanthrene-10-oxide,
6-phenyl-9,10-dihydro-9-oxa-10-phosphaphenanthrene-10-oxide,
2-benzyl-9,10-dihydro-9-oxa-10-phosphaphenanthrene-10-oxide,
6-benzyl-9,10-dihydro-9-oxa-10-phosphaphenanthrene-10-oxide,
8-benzyl-9,10-dihydro-9-oxa-10-phosphaphenanthrene-10-oxide,
6,8-di-benzyl-9,10-dihydro-9-oxa-10-phosphaphenanthrene-10-oxide,
2,6,8-tri-benzyl-9,10-dihydro-9-oxa-10-phosphaphenanthrene-10-oxide,
2-(α-methylbenzyl)-9,10-dihydro-9-oxa-10-phosphaphenanthrene-10-oxide,
6-(α-methylbenzyl)-9,10-dihydro-9-oxa-10-phosphaphenanthrene-10-oxide,
8-(α-methylbenzyl)-9,10-dihydro-9-oxa-10-phosphaphenanthrene-10-oxide,
6,8-di(α-methylbenzyl)-9,10-dihydro-9-oxa-10-phosphaphenanthrene-10-oxide,
2,6,8-tri(α-methylbenzyl)-9,10-dihydro-9-oxa-10-phosphaphenanthrene-10-oxide,
2,6-di(α,α-dimethylbenzyl)-9,10-dihydro-9-oxa-10-phosphaphenanthrene-10-oxide,
6-t-butyl-8-methyl-9,10-dihydro-9-oxa-10-phosphaphenanthrene-10-oxide,
6-benzyl-8-methyl-9,10-dihydro-9-oxa-10-phosphaphenanthrene-10-oxide,
6-cyclohexyl-8-t-butyl-9,10-dihydro-9-oxa-10-phosphaphenanthrene-10-oxide,
6-benzyl-8-t-butyl-9,10-dihydro-9-oxa-10-phosphaphenanthrene-10-oxide,
6-(α-methylbenzyl)-8-t-butyl-9,10-dihydro-9-oxa-10-phosphaphenanthrene-10-oxide,
6-t-butyl-8-cyclohexyl-9,10-dihydro-9-oxa-10-phosphaphenanthrene-10-oxide,
6-benzyl-8-cyclohexyl-9,10-dihydro-9-oxa-10-phosphaphenanthrene-10-oxide,
6-t-butyl-8-benzyl-9,10-dihydro-9-oxa-10-phosphaphenanthrene-10-oxide,
6-cyclohexyl-8-benzyl-9,10-dihydro-9-oxa-10-phosphaphenanthrene-10-oxide,
2,6-di-t-butyl-8-benzyl-9,10-dihydro-9-oxa-10-phosphaphenanthrene-10-oxide, and
2,6-dicyclohexyl-8-benzyl-9,10-dihydro-9-oxa-10-phosphaphenanthrene-10-oxide.

These cyclic phosphorous compounds can, of course, be used singly, but more than one of them can also be used in combination.

As the magnesium compounds expressed by the (8) to (9) mentioned above which are used in combination with the cyclic phosphorous compounds expressed by the general formula (4) mentioned above and used in the present invention as β-crystal nucleator, various kind of the magnesium phosphinate compounds mentioned above, magnesium sulfate, basic magnesium sulfate (magnesium oxysulfate), and talc can be mentioned as examples.

These magnesium compounds can, of course, be used singly, but more than one of them can also be used in combination.

Whereas the weight proportion of the mixture of these cyclic phosphorous compounds and magnesium compounds is not specifically restricted, it is usually 0.01 to 100 parts by weight, preferably 0.1 to 10 parts by weight of the magnesium compound per 1 part by weight of the cyclic phosphorous compound.

As the β-crystal nucleator used in the present invention, particularly the followings are preferable:

mixture of γ-quinacridone, adipic acid dianilide, suberic acid dianilide, N,N'-dicyclohexylterephthalamide, N,N'-dicyclohexyl-1,4-cyclohexanedicarboxyamide, N,N'-dicyclohexyl-2,6-naphthalenedicarboxyamide, N,N'-dicyclohexyl-4,4'-biphenyldicarboxyamide, N,N'-bis(p-methylphenyl)hexanediamide, N,N'-bis(p-ethylphenyl) hexanediamide, N,N'-bis(4-cyclohexylphenyl) hexanediamide, p-(N-cyclohexanecarbonylamino) benzoic acid cyclohexylamide, δ-(N-benzoylamino)-n-valeric acid anilide, 3,9-bis[4-(N-cyclohexylcarbamoyl)phenyl]-2,4,8,10-tetraoxaspiro [5.5] undecane, N,N'-dicyclohexanecarbonyl-p-phenylenediamine, N,N'-dibenzoyl-1,5-diaminonaphthalene, N,N'-dibenzoyl-1,4-diaminocyclohexane, N,N'-dicyclohexanecarbonyl-1,4-diaminocyclohexane, or 10-hydroxy-9,10-dihydro-9-oxa-10-phosphaphenanthrene-10-oxide with magnesium stearate; mixture of 10-hydroxy-9,10-dihydro-9-oxa-10-phosphaphenanthrene-10-oxide with (mono, dimixed) magnesium stearylphosphate; mixture of 10-hydroxy-9,10-dihydro-9-oxa-10-phosphaphenanthrene-10-oxide with magnesium (mono, dimixed) stearylphosphate; mixture of 10-hydroxy-9,10-dihydro-9-oxa-10-phosphaphenanthrene-10-oxide with magnesium oxide, mixture of 10-hydroxy-9,10-dihydro-9-oxa-10-phosphaphenanthrene-10-oxide with magnesium hydroxide; mixture of 10-hydroxy-9,10-dihydro-9-oxa-10-phosphaphenanthrene-10-oxide with magnesium carbonate; mixture of 10-hydroxy-9,10-dihydro-9-oxa-10-phosphaphenanthrene-10-oxide with magnesium salt of 10-hydroxy-9,10-dihydro-9-oxa-10-phosphaphenanthrene-10-oxide; mixture of 10-hydroxy-9,10-dihydro-9-oxa-10-phosphaphenanthrene-10-oxide with magnesium-bis(1'-hydroxy-2,2'-biphenylenephosphinate); mixture of 9,10-dihydro-9-oxa-10-phosphapehnanthrene-10-oxide with magnesium sulfate; mixture of 9,10-dihydro-9-oxa-10-phosphaphenanthrene-10-oxide with talc: and mixture of 9,10-dihydro-9-oxa-10-phosphaphenanthrene-10-oxide with magnesium-bis(1'-hydroxy-2,2'-biphenylenephosphinate).

These α-crystal or β-crystal nucleators may, of course, be used singly, and two or more kind thereof may also be used in combination. Blending proportion of the nucleators is 0.0001 to 1 part by weight, preferably 0.01 to 0.5 part by weight, more desirably 0.05 to 0.3 part by weight based on 100 parts by weight of the propylene-ethylene copolymer. When the proportion is far less than 0.0001 part by weight, effect of the improvement on the rigidity, toughness, and impact-strength can not fully be achieved, while when it is far greater than 1 part by weight, more effect of the improvement on the rigidity, toughness, and impact-strength can not be expected.

In the compositions of the present invention, various kind of additives usually added to crystalline propylene polymers can be used together within the range in which achievement of the objects of present invention are not disturbed, examples of the additives include antioxidants such as phenol-, thioether-, and phosphorous-type antioxidants, light stabilizers, heavy metal deactivators (copper deactivators), clarifiers, crystal-nucleators other than those used in the present invention, lubricants, antistatic agents, antifogging agents, antiblocking agents, anti-fog-dropping agents, radical generators such as organic peroxides, flame retardants, flame-retarding auxiliaries, pigments, halogen-scavengers, dispersants or neutralizing agents such as metal soaps, organic or inorganic antifungus agents, inorganic fillers (such as mica, wollastonite, zeolite, bentonite, perlite, diatomaceous earth, asbestos, calcium carbonate, magnesium carbonate, magnesium hydroxide, hydrotalcite, silicon dioxide, titanium dioxide, zinc oxide, magnesium oxide, calcium oxide, zinc sulfide, barium sulfate, magnesium sulfate, calcium silicate, aluminum silicate, glass fibers, potassium silicate, carbon fibers, carbon blacks, graphites, and metal fibers), the inorganic fillers mentioned above and subjected to a surface treatment with surface treating agents such as a coupling agent (for example, those of silane-, titanate-, boron-, aluminate-, and zircoaluminate-type coupling agent), and organic fillers (for example, wood flour, pulps, used papers, synthetic fibers, and natural fibers).

Compositions of the present invention can be obtained, for instance, blending a prescribed amount of the nucleator and the various additives both mentioned above which are usually added to conventional crystalline propylene polymers with a propylene-ethylene copolymer used in the present invention by using a conventional blending apparatus, for example, a Henschel mixer (trade name), super mixer, ribbon blender, or Banbury mixer, melting and kneading them at a melt-kneading temperature of 170 to 300° C., preferably 200 to 270° C. by means of a conventional monoaxial extruder, biaxial extruder, Brabender, or rollers, and subjecting to a pelletizing. The compositions thus obtained can be subjected to production of aimed molded products according to one of various molding methods such as injection molding, extrusion molding, and blow molding.

Now, the present invention will be described in more detail with reference to Examples and Comparative Examples, and the methods for determining the physical properties of the compositions obtained are as follows:

(1) Melt Flow Rate:

Melt flow rate is determined according to ASTM D-1238 at a measuring temperature of 230° C.

(2) Determination of Cf Value:

A fractionating column fabricated by filling glass beads having a diameter of 0.1 mm in a stainless tube having a length of 15 cm and an inner diameter of 0.46 cm over the whole length of 15 cm of the tube is used. The fractionating column is kept at 140° C., and 0.5 ml of a sample prepared by dissolving a polymer in o-dichlorobenzene at 140° C. to give a polymer concentration of 2 mg/ml is fed and retained therein. Subsequently, the temperature of the fractionating column is lowered down to 0° C. at a temperature-lowering rate of 1° C./minute to deposit the polymer in the sample on the surface of the glass beads in the column. Then, o-dichlorobenzene (0° C.) is flown through the fractionating column at a flow rate of 1 ml/minute for 2 minutes, while keeping the temperature of the fractionating column at 0° C., to obtain the polymer soluble in the solvent as extract. Then molecular weight distribution of the polymer in the extracted solution is determined with an infrared detector (wavelength: 3.42 μm). Subsequently temperature is elevated in three steps, that is, each by 10° C. in the range of 0 to 50° C., each by 5° C. in the range of 50 to 90° C., and each by 3° C. in the range of 90 to 140° C., the procedure mentioned above are repeated, and the amount of the polymer extracted at each of the temperatures is determined, and thus the weight fraction and the molecular weight of the respective fractions are determined. Cf value is obtained by calculating A/B when the integrated values of the eluted amount at a temperature lower than 112° C. and 112 C. or higher are assumed to be A and B, respectively. Details of the fractionation mentioned above is reported by J. B. P. Soares in Polymer, Vol. 36, No. 8, pages 1639–1654, 1995.

(3) Determination of Toughness:

(I) To 100 parts by weight of a virgin polymer are added 0.1 part by weight of IRGANOX 1010 (tetrakis[methylene-3-(3',5'-di-butyl-4'-hydroxyphenyl)propionate]methane) (which is a phenol type thermal stabilizer and produced by Ciba Geigy Corporation), and 0.1 part by weight of calcium stearate. Then, they are mixed at room temperature for 10 minutes by means of a high speed agitating mixer (Henschel mixer (trade name)), and granulated by means of an extrusion granulator having a screw diameter of 40 mm. The granules thus obtained are heated by means of a pressing machine under conditions of a melted resin temperature of 230° C. and 4 Mpa for 3 minutes, cooled under conditions of 30° C. and 14.8 Mpa for 3 minutes, and then taken out from the mold to obtain a compression-molded sheet of 0.5 mm thick. A test piece of 50 mm long and 6 mm wide is punched from the compressed sheet. The test piece is stretched in longitudinal direction at 40° C. and at a displacement rate of 10 mm/minute by means of a Strograph (trade name) manufactured by Toyo Seiki Seisakusho Corporation, and the strength at the yield point at that time is assumed to be Sy (unit: Mpa). Subsequently, the stretched test piece used for the determination of the strength of the yield point is cut off at a narrowed, necked portion, and the central part of the test piece is stretched again in longitudinal direction at 40° C. and at a displacement rate of 10 mm/minute and the strength at which the test piece is broken is assumed to be breaking strength Sb (unit: MPa). Herein, (Sb-Sy) is regarded as a measure of toughness. The larger the value, the higher the toughness.

(II) Using the pellets of the polymer composition obtained, a sheet of 100 mm long, 100 mm wide and 0.7 mm thick is prepared according to a method of injection molding, and the gate portion of the sheet is punched in the flow direction of resin by means of a punching machine to obtain a punched test piece of 100 mm long and 10 mm wide. This punched test piece is stretched in the longitudinal direction at 23° C. and at a displacement speed of 15 mm/min by means of a Strograph manufactured by Toyo Seiki Seisakusho Corporation. The strength at the yield point at that time is assumed to be Sy and the breaking strength at that time is assumed to be Sb. Herein, (Sb-Sy) is regarded as a measure of toughness.

(4) Ethylene Content:

Copolymers having different reaction ratios of ethylene and propylene are prepared in advance. Then, a calibration curve is obtained by using the copolymers as standard samples according to infrared absorption spectra, and the content is obtained by employing the calibration curve according to infrared absorption spectra.

(5) Determination of the Ratio of Polymerized Amount in Polymerization step (I) to that in the Polymerization Step (II):

Ethylene content in the whole polymer is obtained by way of the infrared absorption spectra mentioned above. Separately, the ratio of the amount of reacted ethylene/propylene in the polymerization step (II) is obtained, and the ratio captioned above is calculated by using both of the values.

(6) Rigidity:

Rigidity is evaluated according to the following flexural test:

Using the pellets of the copolymer composition obtained, a test piece of 100 mm long, 10 mm wide and 4 mm thick is prepared according to a method of injection molding, and flexural modulus is determined by using the test piece according to JIS K 7203 to evaluate its rigidity. A high rigidity material refers to a material having a high flexural modulus.

(7) Impact-strength:

Impact-strength is evaluated according to the following Izod impact-strength test:

Using the pellets of the copolymer composition obtained, a notched test piece of 63.5 mm long, 13 mm wide and 3.5 mm thick is prepared according to a method of injection molding. Using the test piece, Izod impact strength thereof at −20° C. is determined according to JIS K 7110 to evaluate its impact-strength. A material having a superior impact-strength refers to a material having a high Izod strength.

BEST MODE FOR CARRYING OUT THE INVENTION

Example 1 a) Preparation of Catalyst

Mixture of 230 g of magnesium ethoxide, 415 ml of 2-ethylhexyl alcohol, and 1,650 ml of toluene was kept at 93° C. in an atmosphere of carbon dioxide gas at 0.3 Mpa by using a stainless steel autoclave of 3 l, and agitated for 3 hours to prepare a solution of magnesium carbonate.

Toluene in an amount of 300 ml, 15 ml of tributoxy borane, and 19 ml of titanium tetrachloride were agitated at 30° C. for 5 minutes by using a four-necked flask of 1 l, and 1150 ml of the magnesium carbonate solution mentioned above was added thereto.

The mixed solution was further agitated for 10 minutes, and 2 ml of formic acid, 1 ml of 2-ethylhexylaldehyde, and 60 ml of tetrahydrofuran were added thereto, and then the mixture was agitated at 60° C. for one hour. After the agitation was stopped and the supernatant was removed, the solids thus resulted were washed with 200 ml of toluene. To the solids obtained were added 200 ml of toluene and 100 ml of titanium tetrachloride, and they were agitated at 135° C. for one hour.

After the agitation was stopped and the supernatant was removed, 250 ml of toluene, 100 ml of titanium tetrachloride, and 2.1 ml of di-n-butyl phthalate were added, and they were agitated at 135° C. for 1 and half hours.

Further, after the agitation was stopped and the supernatant was removed, 250 ml of toluene and 100 ml of titanium tetrachloride were added, and they were agitated at 135° C. for 1.5 hour.

After the supernatant was removed, the solids were washed successively with 200 ml of toluene and 200 ml of hexane to obtain a solid catalyst product. This catalyst product had a composition of 2.0% by weight of titanium, 58.3% by weight of chlorine, 19% by weight of magnesium, and 10.7% by weight of di-n-butyl phthalate.

b) Preparation of Preactivated Catalyst

A stainless steel reaction vessel having an internal volume of 50 l provided with slant blades was purged with nitrogen gas. Subsequently, 40 l of n-hexane was charged, and 75 g of the solid catalyst product mentioned above and 13 g triethylaluminum were added at room temperature thereto, and then 100 g of propylene was fed over 120 minutes. After the reaction was finished, unreacted propylene and n-hexane were separated under a reduced pressure to obtain 150 g of a preactivated catalyst.

c) Polymerization Step (I)

n-Hexane in an amount of 250 l was fed into a stainless steel polymerization vessel having an internal volume of 500 l. provided with turbine type agitating blades, and purged with nitrogen gas, 89 g of triethylaluminum and 69 g of di-i-propyldimethoxysilane were fed, and then 15 g of the preactivated catalyst mentioned was added. After the temperature in the vessel was raised up to 70° C., propylene and hydrogen were fed, while keeping the total pressure at 0.8 Mpa and the ratio of the concentration of hydrogen/propylene in the gas phase part at 0.31, polymerization was carried out for 3 hours, and then feeding of propylene was stopped. After the temperature in the vessel was cooled down to 30° C., hydrogen and unreacted propylene were discharged.

d) Polymerization Step (II):

Following to the polymerization step (I), the temperature in the vessel was elevated up to 60° C., ethylene and propylene were continuously fed for 2 hours so as to give a feeding ratio of ethylene of 40%. Total amount of the ethylene supplied was 4.5 Kg. During polymerization, hydrogen was fed so as to give a hydrogen concentration in gas phase of 1% by mol. Then, feeding of ethylene and propylene was stopped, the temperature in the vessel was cooled down to 30° C., and unreacted ethylene and propylene were discharged. Subsequently, 50 l of methanol was fed into the vessel and the temperature in the vessel was raised up to 60° C. Thirty minutes after, 0.5 l of 20 weight % of aqueous solution of sodium hydroxide was further added, agitated for 20 minutes, 100 l of deionized water was added, washed with the water for 10 minutes, and the water phase was withdrawn. After the water was withdrawn, 300 l of deionized water was further added, agitated for 10 minutes, and the water phase was withdrawn. Then the hexane slurry was withdrawn, subjected to a filtration, and dried to obtain a propylene-ethylene copolymer composition of the present invention.

The composition thus obtained was analyzed and the results are shown in Table 1 below.

e) Production of Injection-molded Product

To 3.0 Kg of the powder product obtained by the procedures described above were added 0.003 Kg of a phenolic thermal stabilizer and 0.003 Kg of calcium stearate, and they were mixed by means of a high speed stirring type mixer (Henschel Mixer (trade name)) at room temperature for 10 minutes and the mixture was granulated by using a screw type extrusion-granulator having a screw diameter of 40 mm. Granulates thus obtained were molded into a JIS test piece at a temperature of molten resin of 230° C. and at a mold temperature of 50° C. by means of an injection molding machine. The test piece was conditioned in the state where it was kept for 72 hours in a chamber at a humidity of 50% and at room temperature of 23° C. to obtain a sample for evaluating the physical properties thereof. The results of the evaluation are shown in Table 2.

Example 2

Polymerization was carried out in the same manner as that in Example 1 with the exception that two kind of organosilicon compounds, i.e. dicyclopentyldimethoxysilane and propyltriethoxysilane were used in place of di-i-propyldimethoxysilane in the catalyst system used in Example 1. The results are shown in Tables 1 and 2.

Examples 3 to 9

Various polymer compositions were synthesized by using the same catalyst and in the same polymerization process as those in Example 1 with the exception that ethylene/propylene proportion and hydrogen concentration were varied, and their physical properties were measured. The results are shown in Tables 1 and 2.

Comparative Example 1

Example 1 was repeated with the exception that the solid catalyst component in the catalyst used in Example 1 was changed to the reduction type catalyst described in Example 1 of Laid-open Japanese Patent Publication No. Sho 58-201816; triethylaluminum was changed to diethylaluminum chloride; and di-i-propyldimethoxysilane was changed to methyl p-toluylate. The results are shown in Tables 1 and 2.

Comparative Examples 2 to 4

Example 1 was repeated with the exception that the polymerization conditions in Example 1 were changed to those shown in Table 1. The results are shown in Tables 1 and 2.

TABLE 1

| | Polymerization step (I) | | | | | | Polymerization step (II) | | | Log |
|---|---|---|---|---|---|---|---|---|---|---|
| | Polymerization proportion (wt %) | MFR (i) (g/10 min) | Cf (ratio) | Toughness (MPa) | Number average molecular weight | 0ensity (g/cm$^3$) | Polymerization proportion (wt %) | (ii) (g/10 min) | C"3/C"2 (wt/ ratio) | MFR (i)/ MFR (ii) |
| Example 1 | 90 | 200 | 0.31 | 13.2 | 19200 | 0.90 | 10 | 0.001 | 60/40 | 5.3 |
| Example 2 | 90 | 198 | 0.46 | 9.5 | 19100 | 0.90 | 10 | 0.001 | 60/40 | 5.3 |
| Example 3 | 85 | 355 | 0.40 | 11.4 | 16700 | 0.91 | 15 | 0.002 | 60/40 | 5.2 |
| Example 4 | 90 | 150 | 0.15 | 16.9 | 21000 | 0.90 | 10 | 0.00001 | 60/40 | 7.2 |
| Example 5 | 90 | 400 | 0.41 | 10.4 | 16200 | 0.91 | 10 | 0.001 | 60/40 | 5.6 |
| Example 6 | 90 | 900 | 0.47 | 7.8 | 13200 | 0.92 | 10 | 0.0007 | 60/40 | 6.1 |
| Example 7 | 92 | 210 | 0.32 | 13.2 | 18900 | 0.90 | 8 | 0.0001 | 60/40 | 5.3 |
| Example 8 | 90 | 190 | 0.28 | 13.8 | 19500 | 0.90 | 10 | 0.0001 | 65/35 | 5.3 |
| Example 9 | 90 | 200 | 0.31 | 13.4 | 19200 | 0.90 | 10 | 0.0001 | 30/70 | 5.3 |
| Comp. Example 1 | 90 | 200 | 0.60 | 6.1 | 9000 | 0.90 | 10 | 0.001 | 50/40 | 5.3 |
| Comp. Example 2 | 90 | 200 | 0.29 | 13.4 | 19200 | 0.90 | 10 | 0.0007 | 90/10 | 5.5 |
| Comp. Example 3 | 90 | 200 | 0.31 | 13.3 | 19200 | 0.90 | 10 | 0.0007 | 10/90 | 5.5 |
| Comp. Example 4 | 92 | 180 | 0.27 | 13.9 | 14800 | 0.90 | 8 | 0.01 | 60/40 | 4.3 |

In the Table, C"3 and C"2 indicate the weight of propylene and ethylene polmerized in the polymerization step (II), respectively.

TABLE 2

| | Whole polymer composition | | |
|---|---|---|---|
| | MFR (g/10 min) | Flexural modulus (MPa) | Izod impact strength (J/m, 23° C.) |
| Example 1 | 59 | 1800 | 90 |
| Example 2 | 58 | 1600 | 80 |
| Example 3 | 58 | 1600 | 110 |
| Example 4 | 29 | 1790 | 200 |
| Example 5 | 110 | 1850 | 70 |
| Example 6 | 220 | 1850 | 50 |
| Example 7 | 79 | 1820 | 80 |
| Example 8 | 56 | 1850 | 90 |
| Example 9 | 59 | 1800 | 86 |
| Comparative Example 1 | 59 | 1200 | 70 |
| Cornparative Exarnple 2 | 57 | 1500 | 30 |
| Cornparative Example 3 | 57 | 1500 | 40 |
| Comparative Example 4 | 82 | 1550 | 78 |

Evaluation of the Results

When Examples 1 and 2 are compared with Comparative Example 1, the melt flow rate of propylene polymers are almost the same but the toughness, flexural modulus, and Izod impact strength notably decrease as the Cf value increases as apparent from Tables 1 and 2. When Examples 1 and 3 are compared with Comparative Example 1, the toughness, flexural modulus, and Izod impact strength in Comparative Example 1 are notably low as apparent from Tables 1 and 2. These results show that the use of a propylene polymer having a Cf value of 0.5 or less is necessary for obtaining propylene-ethylene copolymer compositions having a low melt flow, a high rigidity, a high toughness, and a high impact strength.

When Examples 1, 3, 8 and 9 are compared with Comparative Examples 2 and 3, it is apparent that the melt flow rate of the propylene-ethylene copolymer compositions are almost the same, but in the latter cases, there is a large difference in the flexural modulus and the Izod impact strength since the reaction ratios of propylene/ethylene in the polymerization step (II) are outside the scope of the present invention. From the results, it is clear that the propylene-ethylene copolymer compositions of the present invention have a high rigidity, high toughness, high impact-strength, and superior moldability. Further, Examples 4 to 7 show that similar results are obtained in a broad range of the melt flow rate.

When Examples 7 and 8 are compared with Comparative Example 4, it is understood that the polymerization proportions of propylene and the melt flow rates of the propylene polymer in the polymerization step (I) and the reaction ratios of propylene/ethylene in the polymerization step (II) are almost the same, but the value of common logarithm of the ratio of the melt flow rate (MFR(i)) of the propylene polymer obtained in the polymerization step (I) to the melt flow rate (MFR(ii)) of the propylene-ethylene copolymer obtained in the polymerization step (II) (MFR(i)/MFR(ii)) in Comparative Example 4 is small compared with those in Examples 7 and 8; and the flexural modulus and Izod impact strength in Comparative Example 4 are notably inferior to those in Examples 7 and 8.

In the production process of the present invention, the polymerization step (I) and the polymerization step (II) can continuously be carried out; controls of ethylene content and others are easy; and copolymer compositions having a small quality variation can be provided.

Examples 10 to 17 and Control Examples 1 to 4

One hundred parts by weight of an unstabilized, powdery propylene-ethylene copolymer having a MFR, Cf value and ethylene-propylene composition at polymerization step (II) described in Table 3 and the α-crystal nucleators and other additives shown in [1] to [14] mentioned below were put in a Henschel mixer (trade name) in a blending ratio described in Table 3 below, mixed and agitated for 3 minutes, and then subjected to a melt-kneading at 200° C. by means of a monoaxial extruder having a die orifice diameter of 40 mm and converted into pellets.

Further, as Control Examples 1 to 4, a prescribed amount of the additives described in Table 3 were blended, respectively, to 100 parts by weight of an unstabilized, powdery crystalline propylene-ethylene copolymer having a MFR, Cf value, and propylene-ethylene copolymer composition described in Table 3, and subjected to a melt-kneading in the same manner as in Examples 10 to 17 to obtain pellets.

Test pieces used for evaluating the toughness were prepared by subjecting the pellets obtained to an injection molding at a resin temperature of 250° C. and at a mold temperature of 50° C., and punching the molded article. Further, test pieces used for evaluating the rigidity and impact-strength were prepared by subjecting the pellets obtained to an injection molding at a resin temperature of 250° C. and at a mold temperature of 50° C.

Using the test pieces thus obtained and according to the test methods mentioned above, the toughness, rigidity, and impact-strength were evaluated. The results are shown in Table 3.

The α-crystal nucleators and additives of the present invention and shown in Table 3 are as follows:

α-crystal nucleator [1]: talc
    ditto [2]: aluminum hydroxy-bis(4-t-butylbenzoate)
    ditto [3]: 1.3,2.4-dibenzylidene sorbitol
    ditto [4]: 1.3,2.4-bis(p-methylbenzylidene)sorbitol
    ditto [5]: 1.3,2.4-bis(p-ethylbenzylidene)sorbitol
    ditto [6]: 1.3,2.4-bis(2',4'-dimethylbenzylidene) sorbitol
    ditto [7]: 1.3,2.4-bis(3',4'-dimethylbenzylidene) sorbitol
    ditto [8]: 1.3-p-chlorobenzylidene-2.4-p-methylbenzylidene sorbitol
    ditto [9]: sodium-bis(4-t-butylphenyl)phosphate
    ditto [10]: sodium-2,2'-methylene-bis(4,6-di-t-butylphenyl)phosphate
    ditto [11]: a mixture of aluminumdihydroxy-2,2'-methylene-bis(4,6-di-t-butylphenyl)phosphate, aluminum hydroxy-bis[2,2'-methylene-bis(4,6-di-t-butylphenyl) phosphate], and lithium stearate (1:1:1 (weight ratio))
    ditto [12]: poly 3-methyl-1-butene
    ditto [13]: polyvinylcyclohexane
    ditto [14]: polyallyltrimethylsilane
Phenolic antioxidant: tetrakis[methylene-3-(3',5'-di-t-butyl-4'-hydroxyphenyl)propionate]methane
Phosphoric antioxidant: bis(2,4-di-t-butylphenyl)penta-erythritol-diphosphite
Ca-St : calcium stearate

TABLE 3

| | | Example | | | | | | | | | | |
|---|---|---|---|---|---|---|---|---|---|---|---|---|
| | | 10 | 11 | 12 | 13 | 14 | 15 | 16 | 17 | 18 | 19 | 20 |
| MFR (g/10 min) | | 0.4 | 3 | 30 | 150 | 10 | 50 | 22 | 7 | 11 | 45 | 125 |
| Cf value (ratio) | | 0.31 | 0.46 | 0.40 | 0.15 | 0.41 | 0.47 | 0.32 | 0.28 | 0.31 | 0.11 | 0.24 |
| Polymer of polymerization step (II) | Proportion (wt %) | 10 | 10 | 10 | 10 | 15 | 15 | 10 | 10 | 8 | 8 | 8 |
| | R-$C_2$** (wt %) | 40 | 40 | 40 | 40 | 40 | 40 | 40 | 40 | 40 | 40 | 50 |
| Blending wt. part* | α-crystal nucleator [1] | 0.05 | — | — | — | — | — | — | — | — | — | — |
| | α-crystal nucleator [2] | — | 0.1 | — | — | — | — | — | — | — | — | — |
| | α-crystal nucleator [3] | — | — | 0.25 | — | — | — | — | — | — | — | — |
| | α-crystal nucleator [4] | — | — | — | 0.3 | — | — | — | — | — | — | — |
| | α-crystal nucleator [5] | — | — | — | — | 0.15 | — | — | — | — | — | — |
| | α-crystal nucleator [6] | — | — | — | — | — | 0.2 | — | — | — | — | — |
| | α-crystal nucleator [7] | — | — | — | — | — | — | 0.1 | — | — | — | — |
| | α-crystal nucleator [8] | — | — | — | — | — | — | — | 0.5 | — | — | — |
| | α-crystal nucleator [9] | — | — | — | — | — | — | — | — | 0.4 | — | — |
| | α-crystal nucleator [10] | — | — | — | — | — | — | — | — | — | 0.1 | — |
| | α-crystal nucleator [11] | — | — | — | — | — | — | — | — | — | — | 0.2 |
| | α-crystal nucleator [12] | — | — | — | — | — | — | — | — | — | — | — |
| | α-crystal nucleator [13] | — | — | — | — | — | — | — | — | — | — | — |
| | α-crystal nucleator [14] | — | — | — | — | — | — | — | — | — | — | — |
| | Phenolic antioxidant | 0.05 | 0.05 | 0.05 | 0.05 | 0.05 | 0.05 | 0.05 | 0.05 | 0.05 | 0.05 | 0.05 |
| | Phosphoric antioxidant | 0.05 | 0.05 | 0.05 | 0.05 | 0.05 | 0.05 | 0.05 | 0.05 | 0.05 | 0.05 | 0.05 |
| | Ca - St | 0.05 | 0.05 | 0.05 | 0.05 | 0.05 | 0.05 | 0.05 | 0.05 | 0.05 | 0.05 | 0.05 |
| Toughness (MPa) | | 6.5 | 6.1 | 6.2 | 6.9 | 6.5 | 6.1 | 6.5 | 6.8 | 6.3 | 6.8 | 6.5 |
| Bending modulus × $10^3$ (MPa) | | 1.58 | 1.55 | 1.56 | 1.58 | 1.45 | 1.46 | 1.54 | 1.55 | 1.733 | 1.76 | 1.70 |
| Izod impact strength (J/m. −20° C.) | | 56 | 55 | 54 | 53 | 65 | 54 | 54 | 55 | 54 | 53 | 54 |

| | | Example | | | | | | | Control Example | | | |
|---|---|---|---|---|---|---|---|---|---|---|---|---|
| | | 21 | 22 | 23 | 24 | 25 | 26 | 27 | 1 | 2 | 3 | 4 |
| MFR (g/10 min) | | 82 | 60 | 35 | 23 | 23 | 23 | 23 | 20 | 20 | 20 | 20 |
| Cf value (ratio) | | 0.37 | 0.36 | 0.30 | 0.31 | 0.31 | 0.31 | 0.31 | 0.60 | 0.60 | 0.60 | 0.60 |
| Polymer of polymerization step (II) | Proportion (wt %) | 10 | 10 | 10 | 10 | 10 | 10 | 10 | 10 | 10 | 10 | 10 |
| | R-$C_2$** (wt %) | 35 | 60 | 70 | 40 | 40 | 40 | 40 | 40 | 40 | 40 | 40 |
| Blending wt. part* | α-crystal nucleator [1] | — | — | — | 0.1 | — | — | 0.1 | — | — | — | — |
| | α-crystal nucleator [2] | — | — | — | 0.1 | — | — | — | 0.1 | — | — | — |
| | α-crystal nucleator [3] | — | — | — | — | 0.05 | — | — | — | — | — | — |
| | α-crystal nucleator [4] | — | — | — | — | 0.05 | 0.1 | — | — | 0.3 | — | — |
| | α-crystal nucleator [5] | — | — | — | — | 0.05 | — | — | — | — | — | — |
| | α-crystal nucleator [6] | — | — | — | — | 0.05 | — | — | — | — | — | — |
| | α-crystal nucleator [7] | — | — | — | — | 0.05 | 0.1 | — | — | — | — | — |
| | α-crystal nucleator [8] | — | — | — | — | 0.05 | — | — | — | — | — | — |
| | α-crystal nucleator [9] | — | — | — | — | — | — | — | — | — | — | — |
| | α-crystal nucleator [10] | — | — | — | — | — | 0.1 | 0.1 | — | — | 0.1 | — |
| | α-crystal nucleator [11] | — | — | — | — | — | — | — | — | — | — | — |
| | α-crystal nucleator [12] | $10^{-3}$ | — | — | — | — | — | 0.01 | — | — | — | $10^{-3}$ |
| | α-crystal nucleator [13] | — | $10^{-4}$ | — | — | — | — | — | — | — | — | — |
| | α-crystal nucleator [14] | — | — | 0.01 | — | — | — | — | — | — | — | — |
| | Phenolic antioxidant | 0.05 | 0.05 | 0.05 | 0.05 | 0.05 | 0.05 | 0.05 | 0.05 | 0.05 | 0.05 | 0.05 |
| | Phosphoric antioxidant | 0.05 | 0.05 | 0.05 | 0.05 | 0.05 | 0.05 | 0.05 | 0.05 | 0.05 | 0.05 | 0.05 |
| | Ca - St | 0.05 | 0.05 | 0.05 | 0.05 | 0.05 | 0.05 | 0.05 | 0.05 | 0.05 | 0.05 | 0.05 |
| Toughness (MPa) | | 6.2 | 6.3 | 6.5 | 6.7 | 6.9 | 6.5 | 6.6 | −6.9 | −6.8 | −7.2 | −7.0 |
| Bending modulus × $10^3$ (MPa) | | 1.71 | 1.70 | 1.68 | 1.54 | 1.52 | 1.70 | 1.75 | 1.40 | 1.38 | 1.53 | 1.50 |
| Izod impact strength (J/m. −20° C.) | | 53 | 55 | 54 | 55 | 53 | 55 | 56 | 47 | 48 | 49 | 48 |

(Note)
*Part by weight of α-crystal nucleator and additives to propylene-ethylene copolymer (100 wt. parts)
**Ethylene content of polymer of polymerization step (II)

It is seen from Table 3 that the copolymer compositions of Examples 10 to 17 having an α-crystal nucleator blended therein are remarkably superior in rigidity and impact strength as compared with Control Examples wherein no nucleator was added. Examples 28 to 45 and Control Examples 5 to 8

One hundred parts by weight of an unstabilized, powdery, propylene-ethylene copolymer having a MFR, Cf value, and ethylene-propylene composition at the polymerization step (II) described in Table 4 below, and β-crystal nucleators and other additives described in Table 4 were put in a Henschel mixer (trade name) in a blending ratio described in Table 4, mixed and agitated for 3 minutes, and then subjected to a melt-kneading at 200° C. by means of a monoaxial extruder having a die orifice diameter of 40 mm and converted into pellets.

Further, as Control Examples 5 to 8, a prescribed amount of an additive described in Table 4 below was blended to 100 parts by weight of an unstabilized, powdery ethylene-propylene copolymer having a MFR, Cf value, and ethylene-propylene composition described in Table 4, and subjected to a melt-kneading in the same manner as in Examples 28 to 45 to obtain pellets.

Test pieces used for evaluating toughness were prepared by subjecting the pellets obtained to an injection molding at a resin temperature of 250° C. and at a mold temperature of 50° C., and punching the molded article.

Using the test pieces thus obtained, the toughness was evaluated according to the test method mentioned above. The results are shown in Table 4.

Examples 46 to 63 and Control Examples 9 to 12

One hundred parts by weight of an unstabilized, powdery propylene-ethylene copolymer having a MFR, Cf value, and ethylene-propylene composition at the polymerization step (II) described in Table 5 below and a prescribed amount of β-crystal nucleators and other additives were put in a Henschel mixer (trade name) in a blending ratio described in Table 5, mixed and agitated for 3 minutes, and then subjected to a melt-kneading by means of a monoaxial extruder having a die orifice diameter of a 40 mm at 200° C. and converted into pellets.

Further, as Control Examples 9 to 12, a prescribed amount of the additives described in Table 5 below were blended to 100 parts by weight of an unstabilized, powdery propylene-ethylene copolymer having a MFR, Cf value, and ethylene-propylene composition described in Table 5 below, and subjected to a melt-kneading in the same manner as in Examples 28 to 45 to obtain pellets.

The test pieces used for evaluating the toughness were prepared by subjecting the pellets obtained to an injection molding at a resin temperature of 250° C. and at a mold temperature of 50° C., and punching the molded article.

Using the test pieces obtained and according to the test method mentioned above, the toughness was evaluated. The results are shown in Table 5.

The β-crystal nucleators and the additives shown in Tables 4 and 5 are as follows:

β-crystal nucleator [1]: γ-quinacridone
  ditto [2]: adipic acid dianilide
  ditto [3]: suberic acid dianilide
  ditto [4]: N,N'-dicyclohexyl terephthalamide
  ditto [5]: N,N'-dicyclohexyl-1,4-cyclohexane dicarboxyamide
  ditto [6]: N,N'-dicyclohexyl-2,6-naphthalene dicarboxyamide
  ditto [7]: N,N'-dicyclohexyl-4,4'-biphenyl dicarboxyamide
  ditto [8]: N,N'-bis(p-methylphenyl)hexanediamide
  ditto [9]: N,N'-bis(p-ethylphenyl)hexanediamide
  ditto [10]: N,N'-bis(4-cyclohexylphenyl)hexanediamide
  ditto [11]: p-(N-cyclohexanecarbonylamino)benzoic acid cyclohexylamide
  ditto [12]: δ-(N-benzoylamino)-n-valeric acid anilide
  ditto [13]: 3,9-bis[4-(N-cyclohexylcarbamoyl)phenyl]-2,4,8,10-tetraoxaspiro[5.5]undecane
  ditto [14]: N,N'-dicyclohexanecarbonyl-p-phenylenediamine
  ditto [15]: N,N'-dibenzoyl-1,5-diaminonaphthalene
  ditto [16]: N,N'-dibenzoyl-1,4-diaminocyclohexane
  ditto [17]: N,N'-dicyclohexanecarbonyl-1,4-diaminocyclohexane
  ditto [18]: a mixture of 50% by weight of 10-hydroxy-9,10-dihydro-9-oxa-10-phosphaphenanthrene-10-oxide with 50% by weight of magnesium stearate
  ditto [19]: a mixture of 50% by weight of 10-hydroxy-9,10-dihydro-9-oxa-10-phosphaphenanthrene-10-oxide with 50% by weight of (mono, dimixed) magnesium stearyl phosphate
  ditto [20]: mixture of 70% by weight of 10-hydroxy-9,10-dihydro-9-oxa-10-phosphaphenanthrene-10-oxide with 30% by weight of magnesium oxide
  ditto [21]: mixture of 70% by weight of 10-hydroxy-9,10-dihydro-9-oxa-10-phosphaphenanthrene-10-oxide with 30% by weight of magnesium hydroxide
  ditto [22]: mixture of 70% by weight of 10-hydroxy-9,10-dihydro-9-oxa-10-phosphaphenanthrene-10-oxide with 30% by weight of magnesium carbonate
  ditto [23]: mixture of 50% by weight of 10-hydroxy-9,10-dihydro-9-oxa-10-phosphaphenanthrene-10-oxide with 50% by weight of magnesium salt of 10-hydroxy-9,10-dihydro-9-oxa-10-phosphaphenanthrene-10-oxide
  ditto [24]: mixture of 50% by weight of 10-hydroxy-9,10-dihydro-9-oxa-10-phosphaphenanthrene-10-oxide with 50% by weight of magnesium-bis(1'-hydroxy-2,2'-biphenylenephosphinate)
  ditto [25]: mixture of 70% by weight of 9,10-dihydro-9-oxa-10-phosphaphenanthrene-10-oxide with 30% by weight of basic magnesium sulfate
  ditto [26]: mixture of 70% by weight of 9,10-dihydro-9-oxa-10-phosphaphenanthrene-10-oxide with 30% by weight of talc
  ditto [27]: mixture of 50% by weight of 9,10-dihydro-9-oxa-10-phosphaphenanthrene-10-oxide with 50% by weight of magnesium-bis(1'-hydroxy-2,2'-biphenylenephosphinate Phenolic antioxidant: tetrakis[methylene-3-(3',5'-t-butyl-4'-hydroxyphenyl)propionate]methane
Phosphoric antioxidant: bis(2,4-di-t-butylphenyl)-pentaerythritol-diphosphite
Ca-St: calcium stearate

TABLE 4

| | | Example | | | | | | | | | | |
|---|---|---|---|---|---|---|---|---|---|---|---|---|
| | | 28 | 29 | 30 | 31 | 32 | 33 | 34 | 35 | 36 | 37 | 38 |
| | MFR (g/10 min) | 0.4 | 3 | 30 | 150 | 10 | 50 | 22 | 7 | 11 | 45 | 125 |
| | Cf value (ratio) | 0.31 | 0.46 | 0.40 | 0.15 | 0.41 | 0.47 | 0.32 | 0.28 | 0.31 | 0.11 | 0.24 |
| Polymer of polymerization step (II) | Proportion (wt %) | 10 | 10 | 10 | 10 | 15 | 15 | 10 | 10 | 8 | 8 | 8 |
| | R-C$_2$** (wt %) | 40 | 40 | 40 | 40 | 40 | 40 | 40 | 40 | 40 | 40 | 50 |
| Blending wt. part* | β-crystal nucleator [1] | 10$^{-4}$ | — | — | — | — | — | — | — | — | — | — |
| | β-crystal nucleator [2] | — | 0.01 | — | — | — | — | — | — | — | — | — |
| | β-crystal nucleator [4] | — | — | 0.05 | — | — | — | — | — | — | — | — |
| | β-crystal nucleator [6] | — | — | — | 0.1 | — | — | — | — | — | — | — |
| | β-crystal nucleator [8] | — | — | — | — | 0.2 | — | — | — | — | — | — |
| | β-crystal nucleator [10] | — | — | — | — | — | 0.3 | — | — | — | — | — |
| | β-crystal nucleator [12] | — | — | — | — | — | — | 0.5 | — | — | — | — |

TABLE 4-continued

|  |  | | | | | | | | | | | |
|---|---|---|---|---|---|---|---|---|---|---|---|---|
| | β-crystal nucleator [14] | — | — | — | — | — | — | — | $10^{-3}$ | — | — | — |
| | β-crystal nucleator [16] | — | — | — | — | — | — | — | — | 0.4 | — | — |
| | β-crystal nucleator [18] | — | — | — | — | — | — | — | — | — | 0.1 | — |
| | β-crystal nucleator [20] | — | — | — | — | — | — | — | — | — | — | 0.2 |
| | β-crystal nucleator [22] | — | — | — | — | — | — | — | — | — | — | — |
| | β-crystal nucleator [24] | — | — | — | — | — | — | — | — | — | — | — |
| | β-crystal nucleator [26] | — | — | — | — | — | — | — | — | — | — | — |
| | Phenolic antioxidant | 0.05 | 0.05 | 0.05 | 0.05 | 0.05 | 0.05 | 0.05 | 0.05 | 0.05 | 0.05 | 0.05 |
| | Phosphoric antioxidant | 0.05 | 0.05 | 0.05 | 0.05 | 0.05 | 0.05 | 0.05 | 0.05 | 0.05 | 0.05 | 0.05 |
| | Ca - St | 0.05 | 0.05 | 0.05 | 0.05 | 0.05 | 0.05 | 0.05 | 0.05 | 0.05 | 0.05 | 0.05 |
| | Toughness (MPa) | 11.5 | 11.8 | 12.0 | 12.5 | 12.2 | 11.9 | 12.0 | 11.5 | 11.6 | 11.0 | 10.8 |

| | | Example | | | | | | | Control Example | | | |
|---|---|---|---|---|---|---|---|---|---|---|---|---|
| | | 39 | 40 | 41 | 42 | 43 | 44 | 45 | 5 | 6 | 7 | 8 |
| MFR (g/10 min) | | 82 | 60 | 35 | 23 | 23 | 23 | 23 | 20 | 20 | 20 | 20 |
| Cf value (ratio) | | 0.37 | 0.36 | 0.30 | 0.31 | 0.31 | 0.31 | 0.31 | 0.60 | 0.60 | 0.60 | 0.60 |
| Polymer of polymerization step (II) | Proportion (wt %) | 10 | 10 | 10 | 10 | 10 | 10 | 10 | 10 | 10 | 10 | 10 |
| | R-C$_2$** (wt %) | 35 | 60 | 70 | 40 | 40 | 40 | 40 | 40 | 40 | 40 | 40 |
| Blending wt. part* | β-crystal nucleator [1] | — | — | — | — | — | — | $10^{-3}$ | $10^{-4}$ | — | — | — |
| | β-crystal nucleator [2] | — | — | — | 0.01 | — | — | — | — | — | — | — |
| | β-crystal nucleator [4] | — | — | — | 0.01 | — | — | — | — | — | — | — |
| | β-crystal nucleator [6] | — | — | — | 0.01 | — | — | 0.1 | — | 0.1 | — | — |
| | β-crystal nucleator [8] | — | — | — | 0.01 | — | — | — | — | — | — | — |
| | β-crystal nucleator [10] | — | — | — | 0.01 | — | — | — | — | — | — | — |
| | β-crystal nucleator [12] | — | — | — | 0.01 | — | — | — | — | — | — | — |
| | β-crystal nucleator [14] | — | — | — | 0.01 | — | — | — | — | — | — | — |
| | β-crystal nucleator [16] | — | — | — | 0.01 | — | — | — | — | — | — | — |
| | β-crystal nucleator [18] | — | — | — | — | 0.05 | 0.1 | 0.02 | — | — | 0.2 | — |
| | β-crystal nucleator [20] | — | — | — | — | 0.05 | 0.1 | 0.02 | — | — | — | — |
| | β-crystal nucleator [22] | 0.3 | — | — | — | 0.05 | 0.1 | 0.02 | — | — | — | — |
| | β-crystal nucleator [24] | — | 0.5 | — | — | 0.05 | 0.1 | 0.02 | — | — | — | — |
| | β-crystal nucleator [26] | — | — | 1.0 | — | — | 0.1 | 0.02 | — | — | — | 0.2 |
| | Phenolic antioxidant | 0.05 | 0.05 | 0.05 | 0.05 | 0.05 | 0.05 | 0.05 | 0.05 | 0.05 | 0.05 | 0.05 |
| | Phosphoric antioxidant | 0.05 | 0.05 | 0.05 | 0.05 | 0.05 | 0.05 | 0.05 | 0.05 | 0.05 | 0.05 | 0.05 |
| | Ca - St | 0.05 | 0.05 | 0.05 | 0.05 | 0.05 | 0.05 | 0.05 | 0.05 | 0.05 | 0.05 | 0.05 |
| Toughness (MPa) | | 10.5 | 10.8 | 11.1 | 12.3 | 11.6 | 11.2 | 11.9 | −6.0 | −5.8 | −6.6 | −6.3 |

(Note)
*Part by weight of β-crystal nucleator and additives to propylene-ethylene copolymer (100 wt. parts)
**Ethylene content of polymer of polymerization step (II)

TABLE 5

| | | Example | | | | | | | | | | |
|---|---|---|---|---|---|---|---|---|---|---|---|---|
| | | 46 | 47 | 48 | 49 | 50 | 51 | 52 | 53 | 54 | 55 | 56 |
| MFR (g/10 min) | | 0.1 | 3 | 30 | 150 | 10 | 50 | 22 | 7 | 11 | 45 | 125 |
| Cf value (ratio) | | 0.30 | 0.46 | 0.40 | 0.15 | 0.41 | 0.47 | 0.32 | 0.28 | 0.31 | 0.11 | 0.24 |
| Polymer of polymerization step (II) | Proportion (wt %) | 10 | 10 | 10 | 10 | 15 | 15 | 10 | 10 | 8 | 8 | 8 |
| | R-C$_2$** (wt %) | 40 | 40 | 40 | 40 | 40 | 40 | 40 | 40 | 40 | 40 | 50 |
| Blending wt. part* | β-crystal nucleator [1] | $10^{-4}$ | — | — | — | — | — | — | — | — | — | — |
| | β-crystal nucleator [3] | — | 0.01 | — | — | — | — | — | — | — | — | — |
| | β-crystal nucleator [5] | — | — | 0.05 | — | — | — | — | — | — | — | — |
| | β-crystal nucleator [7] | — | — | — | 0.1 | — | — | — | — | — | — | — |
| | β-crystal nucleator [9] | — | — | — | — | 0.2 | — | — | — | — | — | — |
| | β-crystal nucleator [11] | — | — | — | — | — | 0.3 | — | — | — | — | — |
| | β-crystal nucleator [13] | — | — | — | — | — | — | 0.5 | — | — | — | — |
| | β-crystal nucleator [15] | — | — | — | — | — | — | — | $10^{-3}$ | — | — | — |
| | β-crystal nucleator [17] | — | — | — | — | — | — | — | — | 0.4 | — | — |
| | β-crystal nucleator [19] | — | — | — | — | — | — | — | — | — | 0.1 | — |
| | β-crystal nucleator [21] | — | — | — | — | — | — | — | — | — | — | 0.2 |
| | β-crystal nucleator [23] | — | — | — | — | — | — | — | — | — | — | — |
| | β-crystal nucleator [25] | — | — | — | — | — | — | — | — | — | — | — |
| | β-crystal nucleator [27] | — | — | — | — | — | — | — | — | — | — | — |
| | Phenolic antioxidant | 0.05 | 0.05 | 0.05 | 0.05 | 0.05 | 0.05 | 0.05 | 0.05 | 0.05 | 0.05 | 0.05 |
| | Phosphoric antioxidant | 0.05 | 0.05 | 0.05 | 0.05 | 0.05 | 0.05 | 0.05 | 0.05 | 0.05 | 0.05 | 0.05 |
| | Ca - St | 0.05 | 0.05 | 0.05 | 0.05 | 0.05 | 0.05 | 0.05 | 0.05 | 0.05 | 0.05 | 0.05 |
| Toughness (MPa) | | 11.6 | 11.8 | 12.1 | 12.5 | 12.3 | 11.9 | 12.0 | 11.6 | 11.6 | 11.2 | 10.8 |

| | | Example | | | | | | | Control Example | | | |
|---|---|---|---|---|---|---|---|---|---|---|---|---|
| | | 57 | 58 | 59 | 60 | 61 | 62 | 63 | 9 | 10 | 11 | 12 |
| MFR (g/10 min) | | 82 | 60 | 35 | 23 | 23 | 23 | 23 | 20 | 20 | 20 | 20 |

TABLE 5-continued

| | | | | | | | | | | | | |
|---|---|---|---|---|---|---|---|---|---|---|---|---|
| Cf value (ratio) | | 0.37 | 0.36 | 0.30 | 0.31 | 0.31 | 0.31 | 0.31 | 0.60 | 0.60 | 0.60 | 0.60 |
| Polymer of polymerization step (II) | Proportion (wt %) | 10 | 10 | 10 | 10 | 10 | 10 | 10 | 10 | 10 | 10 | 10 |
| | R-C₂** (wt %) | 35 | 60 | 70 | 40 | 40 | 40 | 40 | 40 | 40 | 40 | 40 |
| Blending wt. part* | β-crystal nucleator [1] | — | — | — | — | — | — | $10^{-3}$ | $10^{-3}$ | — | — | — |
| | β-crystal nucleator [3] | — | — | — | 0.01 | — | — | — | — | — | — | — |
| | β-crystal nucleator [5] | — | — | — | 0.01 | — | — | 0.1 | — | 0.1 | — | — |
| | β-crystal nucleator [7] | — | — | — | 0.01 | — | — | — | — | — | — | — |
| | β-crystal nucleator [9] | — | — | — | 0.01 | — | — | — | — | — | — | — |
| | β-crystal nucleator [11] | — | — | — | 0.01 | — | — | — | — | — | — | — |
| | β-crystal nucleator [13] | — | — | — | 0.01 | — | — | — | — | — | — | — |
| | β-crystal nucleator [15] | — | — | — | 0.01 | — | — | — | — | — | — | — |
| | β-crystal nucleator [17] | — | — | — | 0.01 | — | — | — | — | — | — | — |
| | β-crystal nucleator [19] | — | — | — | — | 0.05 | — | 0.02 | — | — | — | — |
| | β-crystal nucleator [21] | — | — | — | — | 0.05 | — | 0.02 | — | — | 0.2 | — |
| | β-crystal nucleator [23] | 0.3 | — | — | — | 0.05 | — | 0.02 | — | — | — | — |
| | β-crystal nucleator [25] | — | 0.5 | — | — | — | 0.1 | 0.02 | — | — | — | 0.2 |
| | β-crystal nucleator [27] | — | — | 1.0 | — | — | 0.1 | 0.02 | — | — | — | — |
| | Phenolic antioxidant | 0.05 | 0.05 | 0.05 | 0.05 | 0.05 | 0.05 | 0.05 | 0.05 | 0.05 | 0.05 | 0.05 |
| | Phosphoric antioxidant | 0.05 | 0.05 | 0.05 | 0.05 | 0.05 | 0.05 | 0.05 | 0.05 | 0.05 | 0.05 | 0.05 |
| | Ca - St | 0.05 | 0.05 | 0.05 | 0.05 | 0.05 | 0.05 | 0.05 | 0.05 | 0.05 | 0.05 | 0.05 |
| Toughness (MPa) | | 10.7 | 10.8 | 11.0 | 12.3 | 11.6 | 11.1 | 11.9 | −6.0 | −5.9 | −6.5 | −6.4 |

(Note)
*Part by weight of β-crystal nucleator and additives to propylene-ethylene copolymer (100 wt. parts)
**Ethylene content of polymer of polymerization step (II)

Examples 28 to 45 described in Table 4 are directed to a blend of a propylene-ethylene copolymer within the scope of the present invention with β-crystal nucleators, whereas Control Examples 5 to 8 are directed to a blend of an ethylene-propylene copolymer outside the scope of the present invention with β-crystal nucleators. It is seen from Table 4 that the products of Examples 28 to 45 are remarkably superior in toughness to those of Control Example 5 to 8. Further, as to the propylene-ethylene copolymer compositions shown in Table 5, an effect similar to that mentioned above is observed.

INDUSTRIAL APPLICABILITY

Propylene-ethylene copolymer compositions having a superior balance of rigidity, toughness, and impact-strength provided by the present invention are used in various commercial fields as starting materials for injection molded products and extrusion molded products.

What is claimed is:

1. A propylene-ethylene copolymer composition having a melt flow rate of 55 to 110 g/10 minutes obtained by
producing 60 to 95% by weight, based on the weight of the whole polymer, of a propylene polymer having a melt flow rate in the range of 100 to 1,000 g/10 minutes and having a ratio (Cf) of integrated values of the propylene polymer dissolved in o-dichlorobenzene at a temperature of lower than 112° C., and a temperature of 112° C. or higher, respectively, which is an index of the stereoregularity in molecules and molecular weight distribution, when the amounts of the propylene polymer dissolved therein at each of the temperatures were determined by raising the temperature of the o-dichlorobenzene continuously or stepwise, of 0.5 or less, by conducting polymerization of propylene in the presence of a highly stereoregular catalyst and hydrogen in a first stage (polymerization step (I)), wherein the molar ratio of hydrogen concentration/polypropylene concentration is in the range of 0.15 or more, and the polymerization pressure is 0 to 5 MPa at a temperature of 20 to 90° C. in the case of a slurry polymerization, and 0.2 to 5 MPa at a temperature of 20 to 150° C. in the case of a gas phase polymerization, and then
producing 5 to 40% by weight, based on the weight of the whole polymer, of an ethylene-propylene copolymer by feeding ethylene, propylene, and hydrogen, the concentration of hydrogen gas being 1 mol % or lower to the product obtained in the first stage so that the content of ethylene becomes 30 to 80% by weight, in a second stage (polymerization step (II)), the propylene-ethylene copolymer composition having a value of common logarithm of the ratio of the melt flow rate of the propylene polymer obtained in the polymerization step (I) (MFR (i)) to the melt flow rate of the ethylene-propylene copolymer obtained in the polymerization step (II) (MFR (ii)), (MFR (i)/MFR (ii)) of 5.05 to 9.

2. A propylene-ethylene copolymer composition comprising 100 parts by weight of the propylene-ethylene copolymer composition defined in claim 1 and 0.0001 to 1 part by weight of an α-crystal nucleator blended therewith.

3. The propylene-ethylene copolymer composition according to claim 2 wherein the α-crystal nucleator is at least one compound selected from the group consisting of talc, metal salts of aromatic carboxylic acids, dibenzylidene sorbitol compounds, metal salts of aromatic phosphoric acids, poly-3-methyl-1-butene, polyvinyl cyclohexanes, and polyallyltrimethylsilanes.

4. The propylene-ethylene copolymer composition according to claim 1 wherein the propylene polymer comprises repeating units expressed by the following general formula (5):

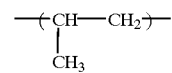

5. A propylene-ethylene copolymer composition comprising 100 parts by weight of the propylene-ethylene copolymer composition defined in claim 1 and 0.0001 to 1 part by weight of a β-crystal nucleator blended therewith.

6. The propylene-ethylene copolymer composition according to claim 5 wherein the β-crystal nucleator is γ-guinacridone; an amide compound expressed by any one of the following (1) to (3); a mixture of a cyclic phosphorus compound expressed by the following general formula (1) with at least one magnesium compound selected from the group consisting of the following (4) to (8); a mixture of a cyclic phosphorus compound expressed by the following general formula (4) with at least one magnesium compound selected from the group consisting of the following (8) and (9); or a mixture of the forgoing:

(1) $R_3$—($R_2$)NCO—$R_1$—CON($R_4$)—$R_5$
(2) $R_7$—CONH—$R_6$—CONH—$R_8$
(3) $R_{10}$—CONH—$R_9$—NHCO—$R_{11}$
(4) Magnesium salt of fatty acids
(5) Magnesium salt of aliphatic phosphoric acids
(6) Magnesium oxide, magnesium hydroxide, or magnesium carbonate
(7) Magnesium salt of cyclic phosphorus compounds expressed by the following general formula (2)
(8) Magnesium phosphinate compounds expressed by the following general formula (3)
(9) Magnesium sulfate or talc General formula (1)

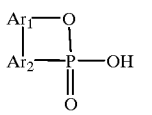

General formula (1)

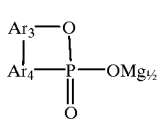

General formula (2)

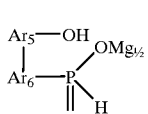

General formula (3)

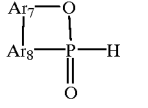

General formula (4)

wherein in the above formulas, when $R_1$ represents a residual group of aromatic dicarboxylic acids except for saturated or unsaturated aliphatic groups or alicyclic groups of 1 to 28 carbon atoms, or 3,9-bis(phenyl-4-yl)-2,4,8,10-tetraoxaspiro [5.5]undecane, then $R_2$ and $R_4$ represent hydrogen, and each of $R_3$ and $R_5$ represents the same or different cycloalkyl group or cycloalkenyl group of 3 to 18 carbon atoms, phenyl group, alkylphenyl group, alkenylphenyl group, cycloalkylphenyl group, biphenyl group, alkylcyclohexyl group, alkenylcyclohexyl group, cycloalkylcyclohexyl group, or phenylcyclohexyl group of 7 to 18 carbon atoms, or phenylalkyl group or cyclohexylalkyl group of 7 to 10 carbon atoms, and when $R_1$ represents 3,9-bis(phenyl-4-yl)-2,4,8,10-tetraoxaspiro[5.5]undecane, then $R_2$ to $R_5$ represent the same or different hydrogen, alkyl group, cycloalkyl group, or aryl group; or each of $R_2$ and $R_3$, and $R_4$ and $R_5$ jointly form an alkylene group by bonding to each other at the respective ω-ends, $R_6$ represents a residual group of saturated or unsaturated aliphatic, alicyclic, or aromatic amino acids of 1 to 28 carbon atoms, $R_7$ and $R_8$ represent the same or different cycloalkyl group or cycloalkenyl group of 3 to 18 carbon atoms, phenyl group, alkylphenyl group, alkenylphenyl group, cycloalkylphenyl group, biphenyl group, alkylcyclohexyl group, alkenylcyclohexyl group, cycloalkylcyclohexyl group, or phenylcyclohexyl group of 7 to 18 carbon atoms, or phenylalkyl group or cyclohexylalkyl group of 7 to 10 carbon atoms, $R_9$ represents a residual group of aliphatic diamines, a residual group of alicyclic diamines, or a residual group of aromatic diamines of 1 to 24 carbon atoms (except for xylylenediamine residual group), $R_{10}$ and $R_{11}$ represent the same or different cycloalkyl group or cycloalkenyl group of 3 to 14 carbon atoms, phenyl group, alkylphenyl group or alkenylphenyl group of 7 to 10 carbon atoms, or phenylalkyl group or cyclohexylalkyl group of 7 to 9 carbon atoms, and $Ar_1$ to $Ar_8$ represent arylene group, alkylarylene group, cycloalkylarylene group, arylarylene group, or aralarylene group, respectively.

7. A process for producing a propylene-ethylene copolymer composition having a melt flow rate of 55 to 110 g/10 minutes, which comprises carrying out the polymerization of propylene by using a highly stereoregular catalyst in the presence of hydrogen in a first stage (polymerization step (I)), wherein the molar ratio of hydrogen concentration/polypropylene concentration is in the range of 0.15 or more, and the polymerization pressure is 0 to 5 MPa at a temperature of 20 to 90° C. in the case of a slurry polymerization, and 0.2 to 5 MPa at a temperature of 20 to 150° C. in the case of a gas phase polymerization, to produce 60 to 95% by weight, based on the weight of the whole polymer, of a propylene polymer having a melt flow rate in the range of 100 to 1,000 g/10 minutes and having a ratio (Cf) of integrated values of the propylene polymer dissolved in o-dichlorobenzene at a temperature of lower than 112° C., and a temperature of 112° C. or higher, respectively, which is an index of the stereoregularity in molecules and molecular weight distribution, when the amounts of the propylene polymer dissolved therein at each of the temperatures were determined by raising the temperature of the o-dichlorobenzene continuously or stepwise, of 0.5 or less, and then in a second stage (polymerization step (II)), producing 5 to 40% by weight, based on the weight of the whole polymer, of an ethylene-propylene copolymer by feeding ethylene, propylene, and hydrogen, the concentration of hydrogen gas being 1 mol % or lower, to the product obtained in the first stage so that the content of ethylene becomes 30 to 80% by weight and a value of common logarithm of the ratio of the melt flow rate of the propylene polymer obtained in the polymerization step (I) (MFR (i)) to the melt flow rate of the ethylene-propylene copolymer obtained in the polymerization step (II) (MFR (ii)), (MFR (i)/MFR (ii)) is 5.05 to 9.

8. The process for producing a propylene-ethylene copolymer composition according to claim 7 wherein the propylene polymer comprises repeating units expressed by the following general formula (5):

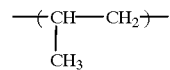

* * * * *